US012724721B2

(12) United States Patent
Cui et al.

(10) Patent No.: US 12,724,721 B2
(45) Date of Patent: Sep. 1, 2026

(54) MEMORY, OPERATION METHOD THEREOF AND MEMORY SYSTEM

(71) Applicant: YANGTZE MEMORY TECHNOLOGIES CO., LTD., Wuhan (CN)

(72) Inventors: Jiameng Cui, Wuhan (CN); Kaikai You, Wuhan (CN); Jianquan Jia, Wuhan (CN); Junbao Wang, Wuhan (CN); Wenhao Xiong, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 62 days.

(21) Appl. No.: 18/680,006

(22) Filed: May 31, 2024

(65) Prior Publication Data

US 2025/0245176 A1 Jul. 31, 2025

(30) Foreign Application Priority Data

Jan. 30, 2024 (CN) ........................ 202410137471.0

(51) Int. Cl.
*G06F 13/16* (2006.01)

(52) U.S. Cl.
CPC .......... *G06F 13/16* (2013.01); *G06F 2213/16* (2013.01)

(58) Field of Classification Search
CPC ............................ G06F 13/16; G06F 2213/16
See application file for complete search history.

(56) References Cited

U.S. PATENT DOCUMENTS

| | | | | |
|---|---|---|---|---|
| 11,996,143 | B2 * | 5/2024 | Nakagawa | G11C 16/3418 |
| 12,283,321 | B2 * | 4/2025 | Du | G11C 16/0433 |
| 2019/0043591 | A1 * | 2/2019 | Fastow | G11C 11/4074 |
| 2019/0189218 | A1 * | 6/2019 | Izumi | H10D 62/292 |
| 2019/0279726 | A1 * | 9/2019 | Li | G11C 16/08 |
| 2019/0287622 | A1 * | 9/2019 | Yamabe | G11C 16/08 |
| 2020/0066350 | A1 * | 2/2020 | Moschiano | G11C 16/3427 |
| 2021/0358550 | A1 * | 11/2021 | Lee | G11C 16/0483 |
| 2024/0079056 | A1 * | 3/2024 | Dong | G11C 16/32 |
| 2025/0174277 | A1 * | 5/2025 | Min | G11C 16/3427 |
| 2025/0245176 | A1 * | 7/2025 | Cui | G06F 13/16 |

* cited by examiner

*Primary Examiner* — Henry Tsai
*Assistant Examiner* — Christopher A Daley
(74) *Attorney, Agent, or Firm* — Conley Rose, P.C.

(57) ABSTRACT

A memory, an operation method thereof, and a memory system are provided. The memory includes: a memory cell array including memory strings each including memory cells and top select transistors; top select gate lines coupled to top select transistors; word lines coupled to memory cells; and a peripheral circuit coupled to top select gate lines and word lines and configured to: apply a first pulse to a first word line of word lines, such that a voltage of the first word line reaches a first target voltage at a first time instant; apply a second pulse to a first top select gate line of top select gate lines adjacent to the first word line, such that a voltage of the first top select gate line reaches a second target voltage at a second time instant that is later than the first time instant.

20 Claims, 16 Drawing Sheets

MEMORY, OPERATION METHOD THEREOF AND MEMORY SYSTEM

CROSS-REFERENCE TO RELATED APPLICATIONS

The present application claims priority to Chinese Patent Application No. 2024101374710, which was filed Jan. 30, 2024, is titled "MEMORY, OPERATION METHOD THEREOF AND MEMORY SYSTEM," and is hereby incorporated herein by reference in its entirety.

TECHNICAL FIELD

The present disclosure relates to the field of semiconductor technology, and particularly to a memory, an operation method thereof and a memory system

BACKGROUND

With the continuous development of current science and technology, semiconductor devices are widely applied in various electronic apparatuses and electronic products. For example, a NAND memory as a non-volatile memory, is a commonly used semiconductor memory device in a computer.

SUMMARY

In view of this, examples of the present disclosure provide a memory, an operation method thereof, and a memory system.

According to a first aspect of the present disclosure, a memory is provided, which comprises: a memory cell array comprising a plurality of memory strings, wherein each of the plurality of memory strings comprises a plurality of top select transistors and a plurality of memory cells, and the plurality of top select transistors are located on a side of the plurality of memory cells; a plurality of top select gate lines coupled to the plurality of top select transistors; a plurality of word lines coupled to the plurality of memory cells; and a peripheral circuit coupled to the plurality of top select gate lines and the plurality of word lines, and configured to: apply a first pulse to a first word line of the plurality of word lines, such that a voltage of the first word line reaches a first target voltage at a first time instant; and apply a second pulse to a first top select gate line of the plurality of top select gate lines adjacent to the first word line, such that a voltage of the first top select gate line reaches a second target voltage at a second time instant, wherein the second time instant is later than the first time instant.

According to a second aspect of the present disclosure, a memory system is provided, which comprises: a memory of any example of the first aspect of the present disclosure; and a memory controller coupled to the memory and configured to control the memory.

According to a third aspect of the present disclosure, an operation method of a memory is provided, wherein the memory comprises a memory cell array and a peripheral circuit coupled to the memory cell array, the memory cell array comprises a plurality of memory strings, and each of the plurality of memory strings comprises a plurality of memory cells and a plurality of top select transistors on a side of the plurality of memory cells; a plurality of word lines are coupled to the plurality of memory cells, and a plurality of top select gate lines are coupled to the plurality of top select transistors; and the operation method comprises: applying a first pulse to a first word line of the plurality of word lines, such that a voltage of the first word line reaches a first target voltage at a first time instant; and applying a second pulse to a first top select gate line of the plurality of top select gate lines adjacent to the first word line, such that a voltage of the first top select gate line reaches a second target voltage at a second time instant, wherein the second time instant is later than the first time instant.

When the memory provided by the examples of the present disclosure performs a program operation, the first pulse is applied to the first word line of the plurality of word lines, and the second pulse is applied to the first top select gate line of the plurality of top select gate lines adjacent to the first word line, wherein the second time instant that the first top select gate line reaches the second target voltage is later than the first time instant that the first word line reaches the first target voltage. In other words, when the first word line reaches the first target voltage at the first time instant, the second pulse may be not applied to the first top select gate line yet, or the voltage of the first top select gate line is still at the rising edge stage and does not reach the second target voltage. At this time, due to a coupling effect of the voltage of the first word line, a voltage spike may occur in the first top select gate line before a rising edge stage or at the rising edge stage. Compared with a voltage spike coupled when the first top select gate line is at the second target voltage, a voltage value of the voltage spike occurring at this time is small, so that the probability of electrical leakage of the unselected memory string may be reduced, thereby improving the program crosstalk problem caused by the electrical leakage of the unselected memory string.

DETAILED DESCRIPTION

In order to make the purpose, technical solutions and advantages of the present disclosure clearer, the present disclosure will be further described in detail below in conjunction with drawings. The described examples should be considered as limitations to the present disclosure. All other examples obtained by those of ordinary skill in the art without creative effort fall in the scope of protection of the present disclosure.

In the following description, "some examples" involved describe a subset of all possible examples. However, it may be understood that "some examples" may be the same subset or a different subset of all possible examples, and may be combined with each other in the case of no conflicts.

In the following description, the terms "first/second/third" involved are only used to distinguish similar objects, and do not represent a specific ordering of the objects. It may be understood that "first/second/third" can be interchanged for the specific sequence or sequential order when the conditions permit to enable the examples of the present disclosure described herein to be implemented in other sequences than those shown or described herein.

It is to be noted that, the terms "include", "comprise" or any variants thereof herein are intended to cover non-exclusive inclusion, such that a process, a method, an article or a device comprising a series of elements comprise not only those elements, but also other elements not listed explicitly, or elements inherent to this process, method, article or device. Without more restrictions, an element defined by a statement "comprising one" do not preclude the presence of another identical element in the process, method, article or device comprising this element.

Unless otherwise defined, all technical and scientific terms used herein have the same meanings as those generally understood by those skilled in the art of the present disclosure. The terms used herein are only intended to describe the purpose of the examples of the present disclosure, instead of limiting the present disclosure.

Figure 1:
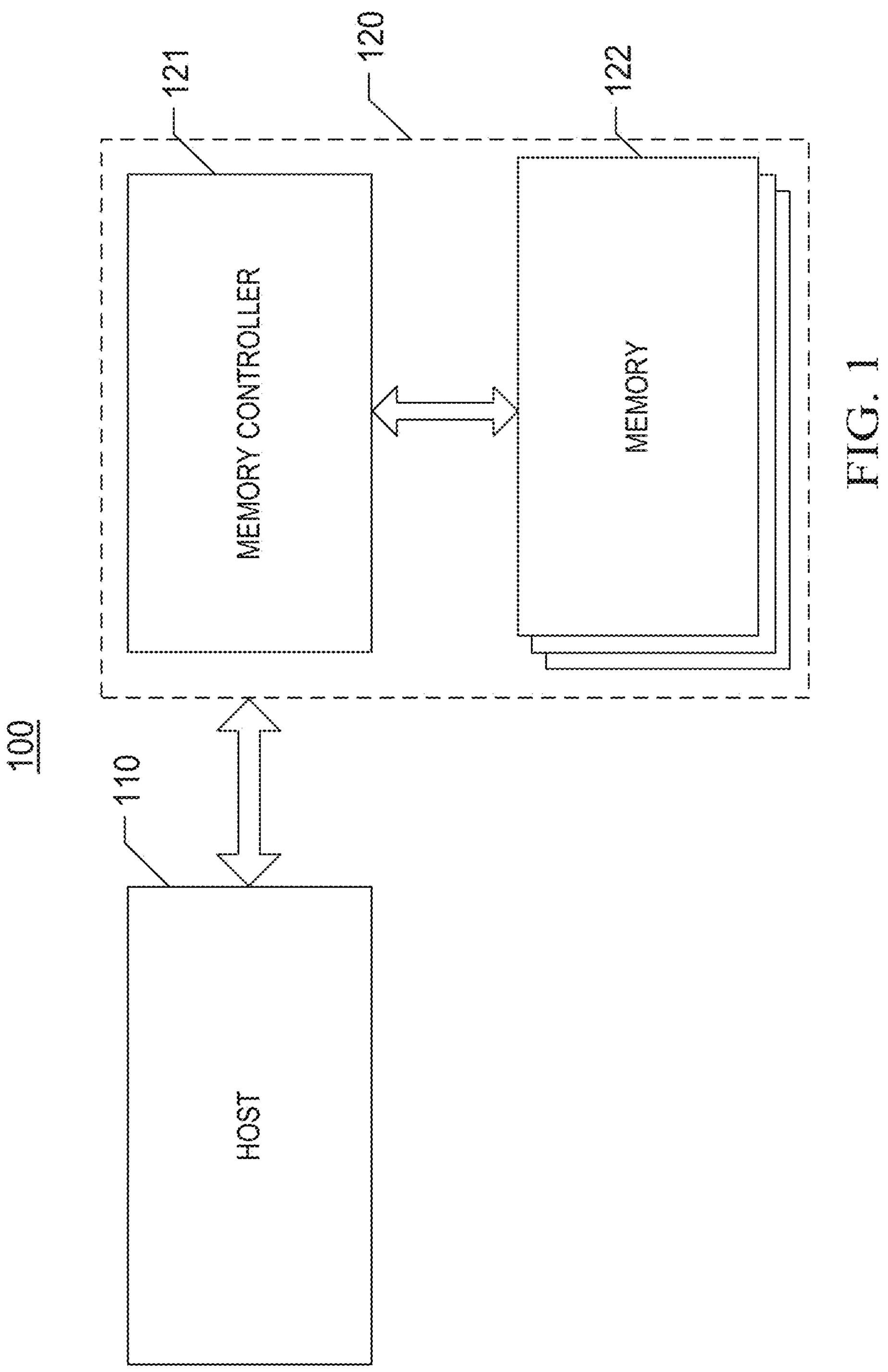
FIG. 1 is a block diagram of an example system comprising a memory provided by examples of the present disclosure.

FIG. 1 is a block diagram of an example system comprising a memory (e.g., memory device) provided by examples of the present disclosure. The example system 100 may comprise a host 110 and a memory system 120. The example system 100 may include, but is not limited to, a mobile phone, a desktop computer, a laptop computer, a tablet computer, a vehicle computer, a gaming console, a printer, a positioning apparatus, a wearable electronic apparatus, a smart sensor, a Virtual Reality (VR) apparatus, an Augmented Reality (AR) apparatus, or any other suitable electronic apparatus having memories 122 therein, and the host 110 may be a processor (e.g., a Central Processing Unit (CPU)) or a System on Chip (SoC) (e.g., an Application Processor (AP)) of an electronic apparatus.

In an example of the present disclosure, the host 110 may be configured to send or receive data to or from the memory system 120. Here, the memory system 120 may comprise a memory controller 121 and one or more memories 122. The memories 122 may include, but are not limited to, a NAND Flash Memory, a vertical NAND Flash Memory, a NOR Flash Memory, a Dynamic Random Access Memory (DRAM), a Ferroelectric Random Access Memory (FRAM), a Magnetoresistive Random Access Memory (MRAM), a Phase Change Random Access Memory (PCRAM), a Resistive Random Access Memory (RRAM), and a Nano Random Access Memory (NRAM), etc.

In an example of the present disclosure, the memory controller 121 may be coupled to the memories 122 and the host 110, and is configured to control the memories 122. In an example, the memory controller 121 may be designed for operating in a low duty-cycle environment such as a Secure Digital (SD) card, a Compact Flash (CF) card, a Universal Serial Bus (USB) flash drive, or other media for use in electronic apparatuses, such as a personal computer, a digital camera, and a mobile phone, etc. In some examples, the memory controller 121 may be also designed for operating in a high duty-cycle environment such as a solid state disk (SSD) or an embedded Multi-Media Card (eMMC), which may be used as a data memory for mobile apparatuses, such as a smartphone, a tablet computer, and a laptop computer, etc., and an enterprise memory array.

Further, the memory controller 121 can manage the data stored in the memories 122 and communicate with the host 110. The memory controller 121 may be configured to control read, erase and program operations of the memories 122, may be further configured to manage various functions with respect to data stored or to be stored in the memories 122, including, but not limited to, bad-block management, garbage collection, logical-to-physical address conversion, wear leveling, etc., and may be further configured to process Error Checking and Correction (ECC) codes with respect to the data read from or written to the memories 122. Furthermore, the memory controller 121 may further perform any other suitable functions, e.g., formatting the memories 122 or communicating with an external apparatus (e.g., the host 110 in FIG. 1) according to a particular communication protocol. In an example, the memory controller 121 may communicate with an external host through at least one of various interface protocols, such as a USB protocol, an MMC protocol, a Peripheral Component Interconnect (PCI) protocol, a Peripheral Component Interconnect Express (PCI-E) protocol, an Advanced Technology Attachment (ATA) protocol, a serial ATA protocol, a parallel ATA protocol, a Small Computer System Interface (SCSI) protocol, an Enhanced Small Drive Interface (ESDI) protocol, an Integrated Development Equipment (IDE) protocol, a Firewire protocol, etc.

Figure 2B:
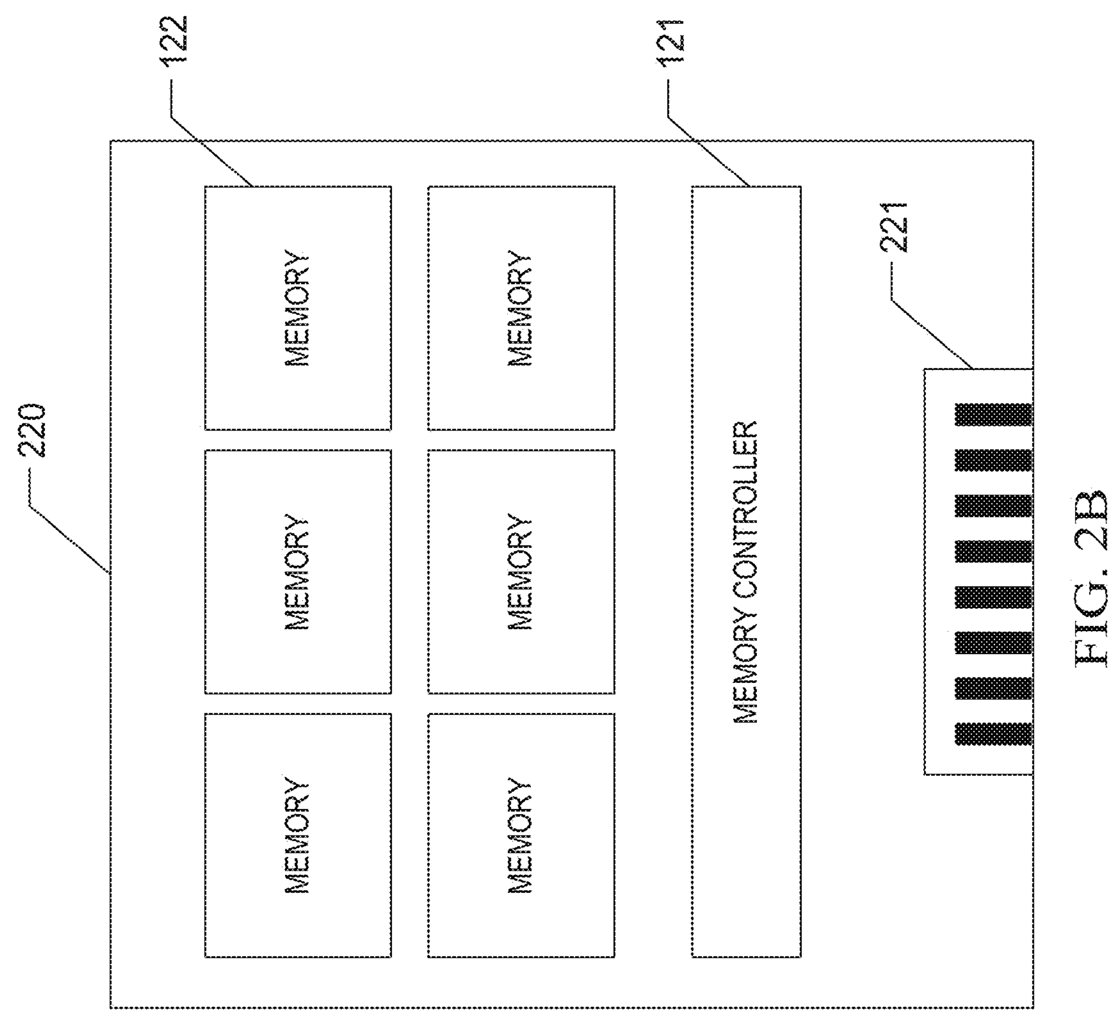
FIG. 2B is a schematic diagram of a solid-state drive provided by examples of the present disclosure.
Figure 2A:
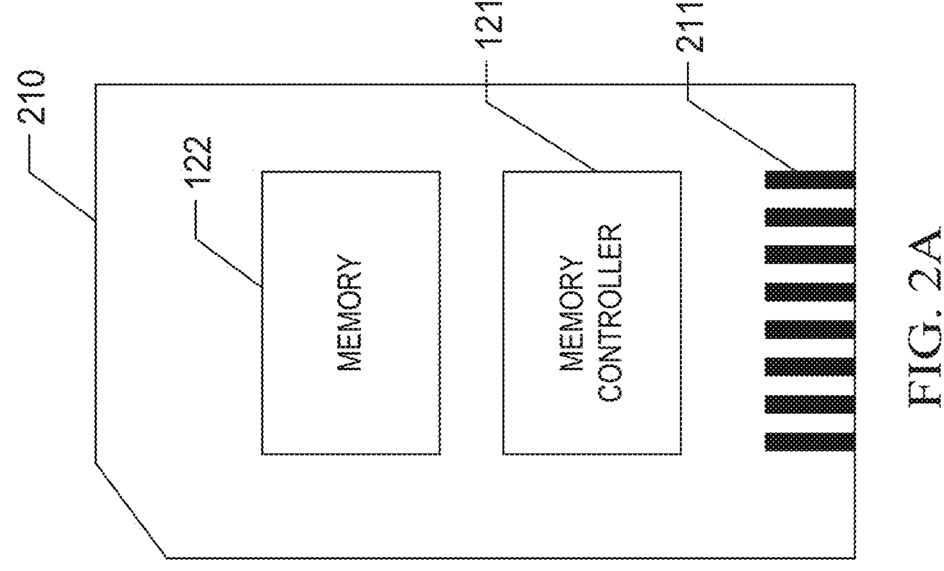
FIG. 2A is a schematic diagram of a memory card comprising a memory provided by examples of the present disclosure.

In an example of the present disclosure, the memory controller 121 and one or more memories 122 may be integrated into various types of storage apparatuses, for example, be included in the same package, such as a Universal Flash Storage (UFS) package or an eMMC package. That is to say, the memory system 120 may be implemented and packaged into different types of end electronic products. As shown in FIG. 2A, the memory controller 121 and a single memory 122 may be integrated together to form a memory card 210. The memory card 210 may comprise a Personal Computer Memory Card International Association (PC) card, a CF card, a Smart Media (SM) card, a memory stick, a Multi-Media Card (MMC, Reduced-Size MMC (RS-MMC), and MMCmicro), an SD card (SD, miniSD, microSD, Secure Digital High Capacity (SDHC)), and a UFS, etc. The memory card 210 may further comprise a memory card connector 211 coupling the memory card 210 with a host (e.g., the host 110 in FIG. 1). In another example as shown in FIG. 2B, the memory controller 121 and a plurality of memories 122 may be integrated together to form an SSD 220. The SSD 220 may further comprise an SSD connector 221 coupling the SSD 220 with a host (e.g., the host 110 in FIG. 1). In some implementations, a storage capacity and/or an operation speed of the SSD 220 are greater than a storage capacity and/or an operation speed of the memory card 210.

Figure 3:
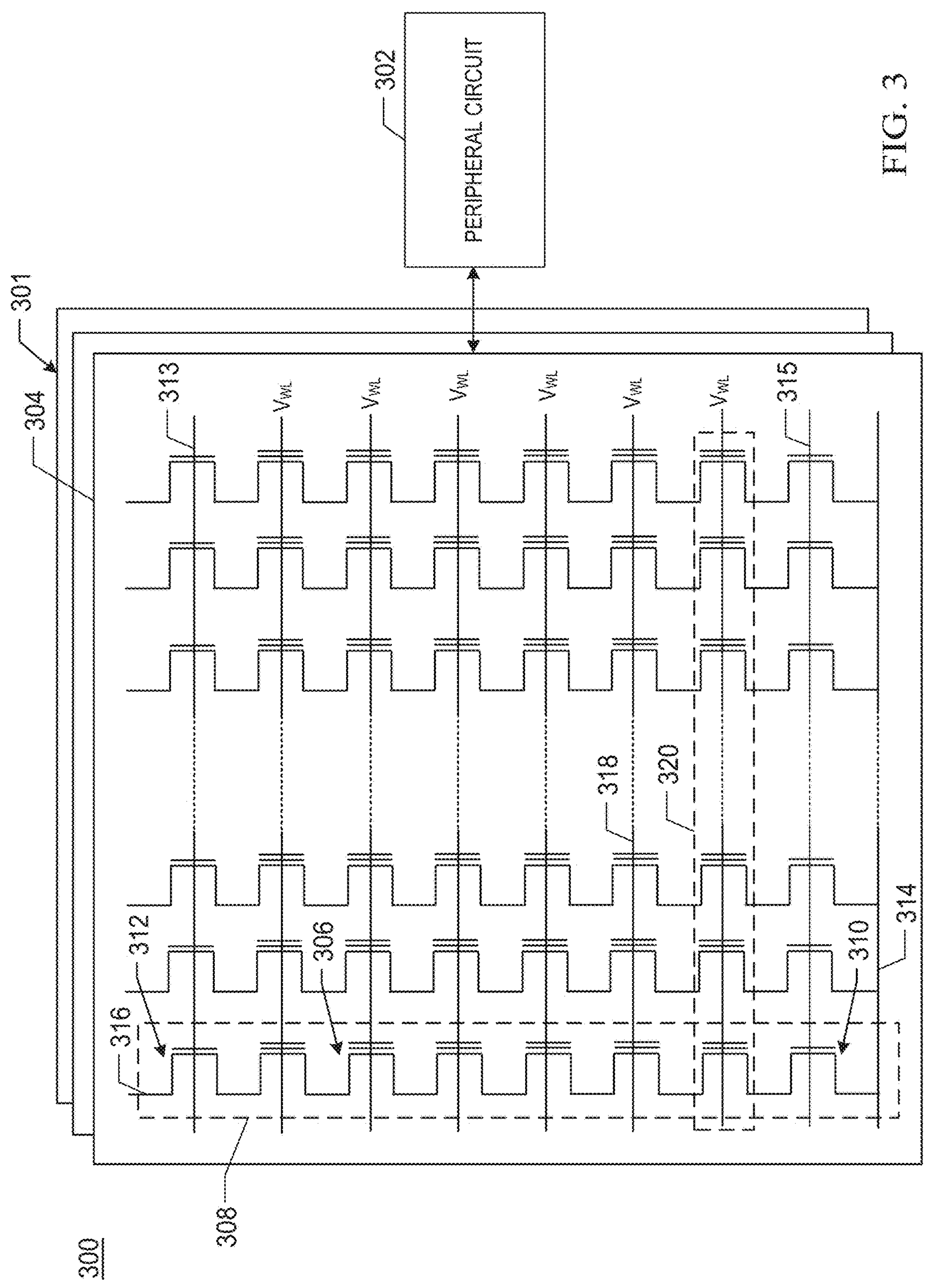
FIG. 3 is a schematic diagram of a memory comprising a peripheral circuit provided by examples of the present disclosure.

It is to be noted that the memory involved in an example of the present disclosure may be a semiconductor memory, which is a solid-state electronic device fabricated by a semiconductor integrated circuit process for storing data information. FIG. 3 is a schematic diagram of a memory comprising a peripheral circuit provided by examples of the present disclosure, wherein the memory 300 may be the memory 122 of FIGS. 1 to 2B. As shown in FIG. 3, the memory 300 may comprise a memory cell array 301 and a peripheral circuit 302 coupled to the memory cell array 301, etc. Here, the memory cell array may be a NAND flash memory cell array, wherein the memory cell array is disposed in a form of an array of memory strings 308 each vertically extending above a substrate. In some examples, each memory string 308 may comprise a plurality of memory cells 306 that are coupled in series and stacked vertically. Each memory cell 306 may hold a continuous, analog value, such as electrical voltage or charges, which depends on the number of electrons trapped within a memory cell region. In addition, each memory cell 306 in the above-mentioned memory cell array 301 may be either a floating gate type memory cell that includes a floating gate transistor, or a charge trapping type memory cell that includes a charge trapping transistor.

As shown in FIG. 3, each memory string 308 may comprise a bottom select transistor 310 at its source terminal, and a top select transistor 312 at its drain terminal. The bottom select transistor 310 and the top select transistor 312 may be configured to activate selected NAND memory strings 308 (a column of the array) during the read and program operations.

In some implementations, sources of the NAND memory strings 308 in the same memory block ("block" for short) 304 are coupled through the same source line (SL) 314 (such as a common source line). In other words, according to some implementations, all the memory strings 308 in the same block 304 have an array common source (ACS). According to some implementations, the top select transistor 312 of each memory string 308 is coupled to a respective bit line 316, and data may be read or written from the bit line 316 via an output bus (not shown).

In some examples, each memory string 308 is configured to be selected or unselected by applying a select voltage (e.g., above a threshold voltage of the top select transistor 312) or an unselect voltage (e.g., 0 V) to a gate of the respective top select transistor 312 via one or more top select gate lines (TSGs) 313, and/or by applying a select voltage (e.g., above a threshold voltage of the bottom select transistor 310) or an unselect voltage (e.g., 0 V) to a gate of the respective bottom select transistor 310 via one or more bottom select gate lines (BSGs) 315. Thus, the memory string 308 may be distinguished as a selected memory string or an unselected memory string.

As shown in FIG. 3, the memory strings 308 can be organized into multiple blocks 304, each of which may have a common source line 314, e.g., coupled to the ground. In some examples, each block 304 is a basic data unit for erase operations, e.g., all the memory cells 306 on the same block 304 are erased at the same time. In order to erase the memory cells 306 in a selected block, the source lines 314 coupled to the selected block as well as unselected blocks that are in the same plane as the selected block can be biased with an erase voltage (Vers), such as a high positive voltage (e.g., 20 V or higher). It is to be understood that in some examples, the erase operation may be performed at a half block level, a quarter block level, or a level having any suitable number of blocks or any suitable fractions of a block.

The memory cells 306 of adjacent ones of the memory strings 308 may be coupled through word lines 318 that select which row of memory cells 306 is affected by the read and program operations. In some examples, each word line 318 is coupled to a page 320 of the memory cells 306, which is the basic data unit for the program operation. The size of one page 320 in bytes may be related to the number of memory strings 308 coupled by the word line 318 in one block 304. Each word line 318 may comprise a plurality of control gates (gate electrodes) at each memory cell 306 in the respective page 320 and a gate line coupling the control gates.

Figure 4:
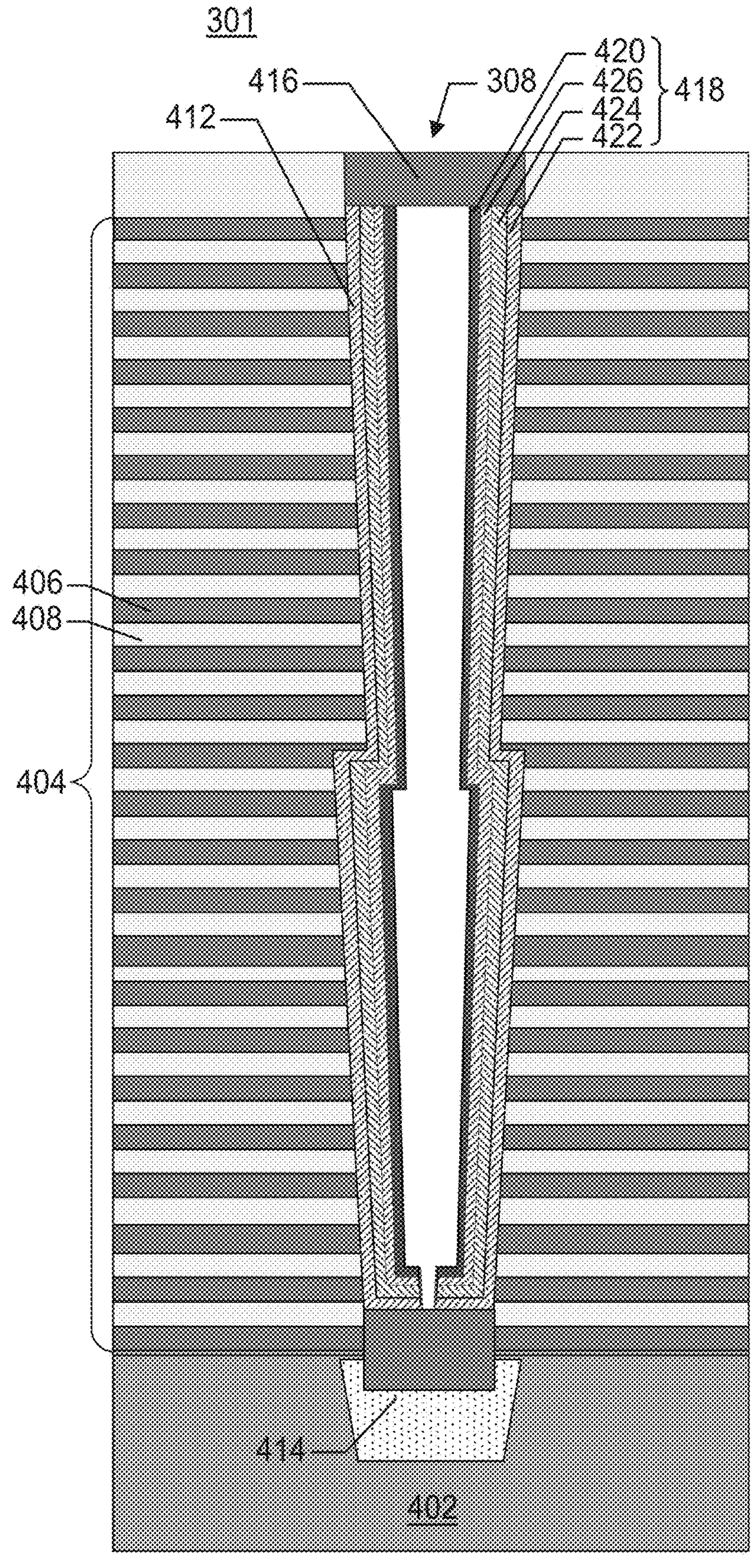
FIG. 4 is a schematic structural diagram of a memory cell array comprising memory strings provided by examples of the present disclosure.

FIG. 4 is a schematic structural diagram of a memory cell array comprising memory strings provided by examples of the present disclosure. As shown in FIG. 4, the memory string 308 may extend vertically above a substrate 402 and through a stack layer 404. The substrate 402 may comprise silicon (e.g., single crystalline silicon), silicon germanium (SiGe), gallium arsenide (GaAs), germanium (Ge), silicon on insulator (SOI), germanium on insulator (GOI), or any other suitable materials.

The stack layer 404 may comprise alternating gate conductive layers 406 and dielectric layers 408, wherein the number of pairs consisting of the gate conductive layers 406 and the dielectric layers 408 may determine the number of memory cells 306 in the memory cell array 301. The gate conductive layer 406 may comprise a conductive material, including, but not limited to, tungsten (W), cobalt (Co), copper (Cu), aluminum (Al), polysilicon, doped silicon, silicides, or any combination thereof. In some implementations, each gate conductive layer 406 comprises a metal layer, e.g., a tungsten layer. In some implementations, each gate conductive layer 406 comprises a doped polysilicon layer. The gate conductive layer 406 may laterally extend at the top of the memory stack layer 404 as the top select gate line 313 in FIG. 3, laterally extend at a bottom of the stack layer 404 as the bottom select gate line 315 in FIG. 3, or laterally extend between the top select gate line 313 and the bottom select gate line 315 as the word line 318 in FIG. 3. It should be understood that although FIG. 3 shows one bottom select gate line 315 and one top select gate line 313, the number of the bottom select gate lines 315 and the number of the top select gate lines 313 (and the number of bottom select transistors 310 and the top select transistors 312 respectively coupled to the bottom select gate lines 315 and the top select gate lines 313) may vary in other examples.

As shown in FIG. 4, the memory string 308 comprises a channel structure 412 vertically extending through the stack layer 404. In some implementations, the channel structure 412 comprises channel holes filled with a semiconductor material (e.g., as semiconductor channels 420) and a dielectric material (e.g., as a memory film 418). In some implementations, the semiconductor channel 420 comprises silicon, e.g., polysilicon. In some implementations, the memory film 418 is a composite dielectric layer comprising a tunneling layer 426, a storage layer 424 (also known as a "charge trapping layer") and a blocking layer 422. The channel structure 412 may have a pillar shape (e.g., a cylindrical shape). According to some implementations, the semiconductor channel 420, the tunneling layer 426, the storage layer 424 and the blocking layer 422 may be arranged in this order radially from a center of the pillar towards an external surface of the pillar. The tunneling layer 426 may comprise silicon oxide, silicon oxynitride, or any combination thereof. The storage layer 424 may comprise silicon nitride, silicon oxynitride, or any combination thereof. The blocking layer 422 may comprise silicon oxide, silicon oxynitride, a high dielectric constant (high-k) dielectric, or any combination thereof. In one example, the memory film 418 may comprise a composite layer composed of silicon oxide/silicon oxynitride/silicon oxide (ONO).

In some examples, as shown in FIG. 4, a well 414 (e.g., a P well and/or an N well) is formed in the substrate 402, and a source terminal of the memory string 308 is in contact with the well 414. For example, the source line 314 in FIG. 3 may be coupled to the well 414 to apply an erase voltage to the well 414 (e.g., a source of the memory string 308) during the erase operation. In some implementations, the memory string 308 further comprises a channel plug 416, for example, as part of a drain of the memory string 308, at the drain terminal of the memory string 308. It is to be understood that a structure of the channel structure 412 depicted in FIG. 4 is only used for illustration purpose and may vary in other examples. It is to be understood that, although not shown in FIG. 4, additional components of the memory cell array 301 may be also formed, and include, but are not limited to, a gate line slit/source contact, a local contact, an interconnect layer, etc.

Figure 5:
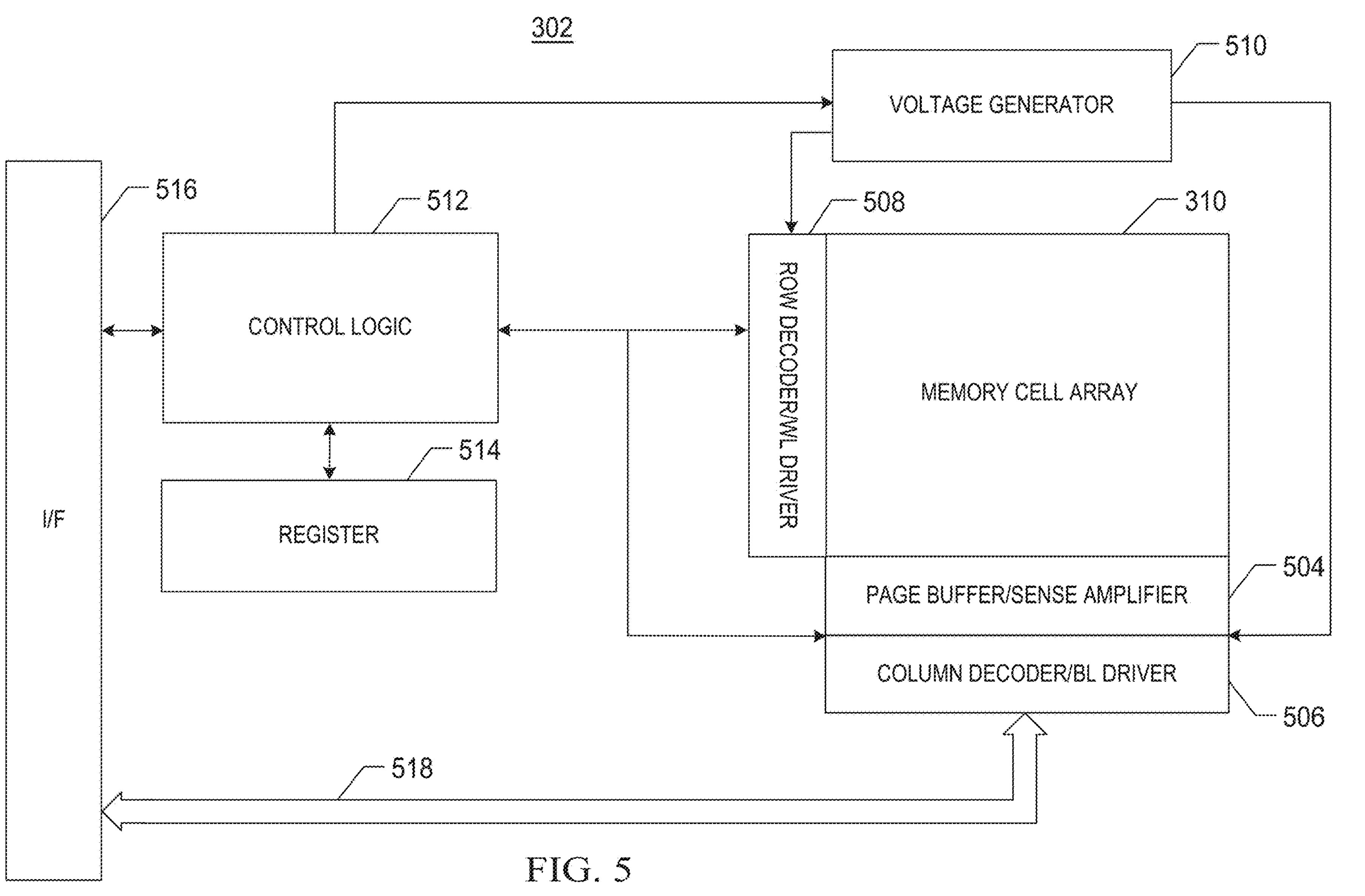
FIG. 5 is a schematic diagram of a peripheral circuit provided by examples of the present disclosure.

Referring back to FIG. 3, the peripheral circuit 302 may be coupled to the memory cell array 301 through the bit line 316, the word line 318, the source line 314, the bottom select gate line 315 and the top select gate line 313. The peripheral circuit 302 may include any suitable analog, digital, and hybrid signal circuits for achieving write and read operations of the memory cell array 301 by applying and sensing voltage signals and/or current signals to and from each target memory cell 306 via the bit line 316, the word line 318, the source line 314, the bottom select gate line 315, and the top select gate line 313. The peripheral circuit 302 may comprise various types of peripheral circuits formed using a metal-oxide-semiconductor (MOS) technology. For example, FIG. 5 is a schematic diagram of a peripheral circuit provided by examples of the present disclosure. Peripheral circuit 302 comprises a page buffer/sense amplifier 504, a column decoder/bitline (BL) driver 506, a row decoder/WL driver 508, a voltage generator 510, a control logic 512, a register 514, an interface (I/F) 516 and a data bus 518. It is understood that in some examples, additional peripheral circuits not shown in FIG. 5 may be included as well.

In conjunction with FIGS. 3 and 5, the page buffer/sense amplifier 504 may be configured to read and program (write) data from and to the memory cell array 301 according to a control signal from the control logic 512. In one example, the page buffer/sense amplifier 504 may store one page of program data (write data) to be programmed into one page 320 of the memory cell array 301. In another example, the page buffer/sense amplifier 504 may execute a program verification operation to ensure that the data has been properly programmed into the memory cell 306 coupled to the selected word line 318. In yet another example, the page buffer/sense amplifier 504 may also sense a low power signal from the bit line 316 that represents a data bit stored in the memory cell 306, and amplifies a small voltage swing to a recognizable logic level in the read operation.

The column decoder/BL driver 506 may be configured to be controlled by the control logic 512 and select one or more memory strings 308 by applying a bit line voltage generated from the voltage generator 510.

The row decoder/WL driver 508 may be configured to be controlled by the control logic 512, and select/unselect the block 304 in the memory cell array 301 and select/unselect the word line 318 in the block 304 according to a control signal generated by the control logic 512. The row decoder/WL driver 508 may be further configured to drive the word lines 318 using different word line voltages generated from the voltage generator 510. In some examples, the row decoder/WL driver 508 may also select/unselect the bottom select gate line 315 and the top select gate line 313. The row decoder/WL driver 508 is configured to use different bottom select gate line voltages generated from the voltage generator 510 to drive the bottom select gate line 315, and/or use different top select gate line voltages generated from the voltage generator 510 to drive the top select gate line 313.

The voltage generator 510 may be configured to be controlled by the control logic 512, and generate various word line voltages (e.g., a read voltage, a program voltage, a pass voltage, a verify voltage, etc.), bit line voltages, ground voltages, various bottom select gate line voltages (e.g., a select voltage and an unselect voltage) and various top select gate line voltages (e.g., a select voltage and an unselect voltage) to be supplied to the memory cell array 301.

The control logic 512 may be coupled to each peripheral circuit portion described above and configured to control the operations of each peripheral circuit portion. The register 514 may be coupled to the control logic 512 and include a state register, a command register, and an address register for storing state information, command operation codes, and command addresses for controlling the operations of the peripheral circuit. In some implementations, the control logic 512 may receive a program command sent by a memory controller (e.g., the memory controller 121 in FIG. 1) and send a control signal to various peripheral circuit portions, e.g., the row decoder/word line (WL) driver 508, the column decoder/BL driver 506 and the voltage generator 510 so as to perform the program operation on the bottom select transistor coupled to the bottom select gate line.

The interface 516 may be coupled to the control logic 512, and act as a control buffer to buffer and relay control commands (e.g., program commands) received from the memory controller or the host to the control logic 512 and state information received from the control logic 512 to the memory controller or the host. The interface 516 may be also coupled to the column decoder/BL driver 506 via the data bus 518 and act as a data input/output (I/O) interface and a data buffer to buffer and relay the data to and from the memory cell array 301.

Figure 6:
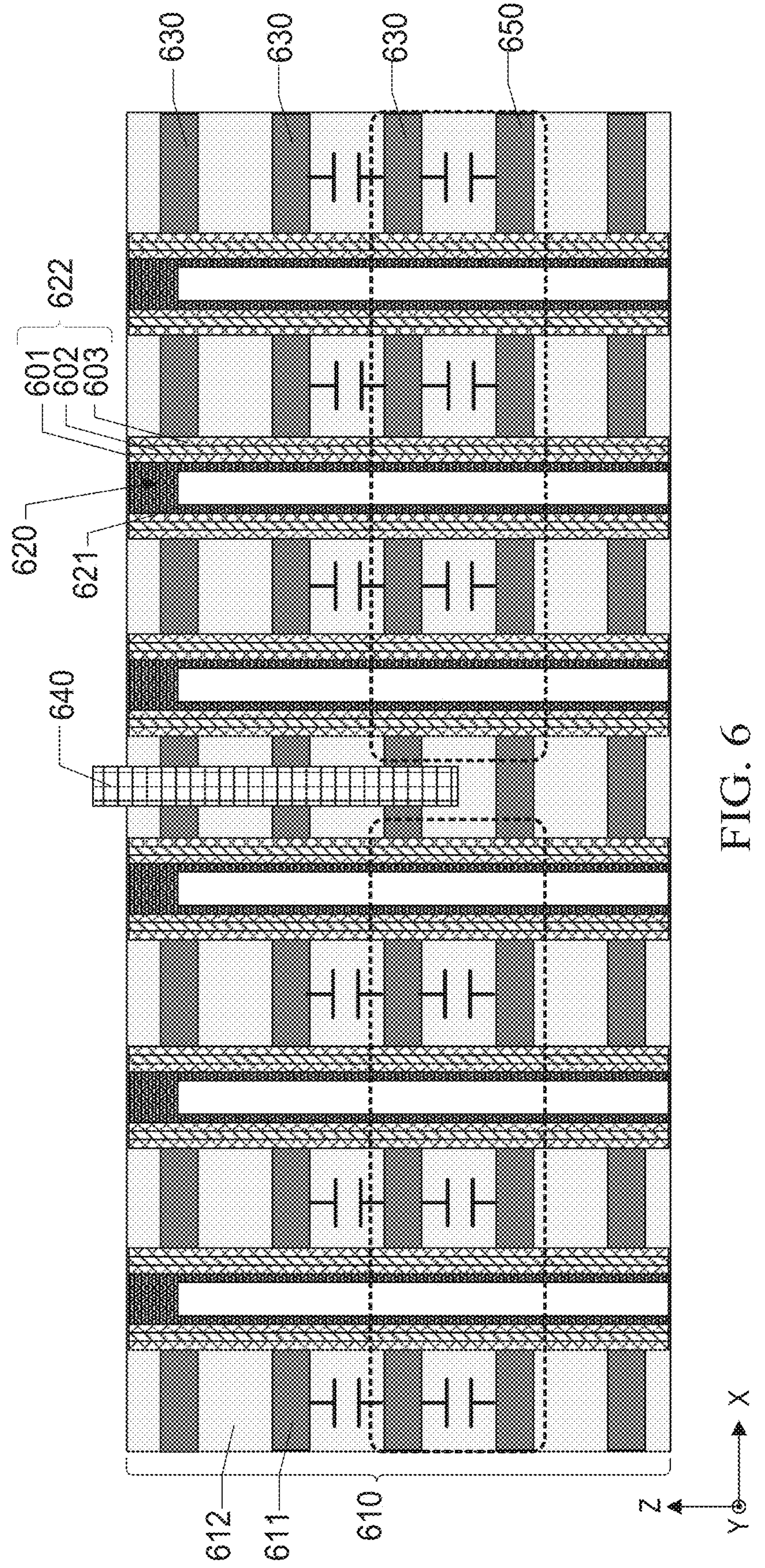
FIG. 6 is a schematic structural diagram of a memory cell array provided by examples of the present disclosure.

FIG. 6 is a schematic structural diagram of a memory cell array provided by examples of the present disclosure. As shown in FIG. 6, the memory cell array comprises a stack layer 610 and a channel structure 620, wherein structures of the stack layer 610 and the channel structure 620 are the same as those of the above-mentioned stack layer 404 and channel structure 412. In an example, the stack layer 610 comprises gate conductive layers 611 and dielectric layers 612 stacked alternately along a vertical direction, and the channel structure 620 is located in the stack layer and extends along the vertical direction. The channel structure 620 comprises a semiconductor channel 621, and a memory film 622 surrounding the semiconductor channel 621. In an example, the semiconductor channel 621 comprises silicon, e.g., polysilicon. In an example, the memory film 622 comprises a tunneling layer 601, a storage layer 602 and a blocking layer 603 sequentially disposed from a center of the channel outward. In an example, the tunneling layer 601 may comprise silicon oxide, silicon oxynitride, or any combination thereof. The storage layer 602 may comprise silicon nitride, silicon oxynitride, or any combination thereof. The blocking layer 603 may comprise silicon oxide, silicon oxynitride, a high dielectric constant (high-k) dielectric, or any combination thereof. In one example, the memory film 622 may be a composite layer composed of silicon oxide/silicon oxynitride/silicon oxide (ONO).

The gate conductive layer 611 at the top of the stack layer 610 is used to form a top select gate line 630. The number of the gate conductive layers for forming the top select gate line may be 1, or more. In this example, as shown in FIG. 6, the three topmost gate conductive layers 611 of the stack layer 610 are used to form the top select gate line 630. The memory cell array further comprises a top select gate cut line 640 that vertically extends through the plurality of topmost gate conductive layers 611 of the stack layer 610 and may extend along a Y direction to cut each of the plurality of gate conductive layers 611 into a plurality of regions each forming one top select gate line 630. In FIG. 6, the three topmost gate conductive layers 611 of the stack layer 610 are divided by the top select gate cut line 640, such that each memory string is coupled with the three top select gate lines 630.

Figure 7:
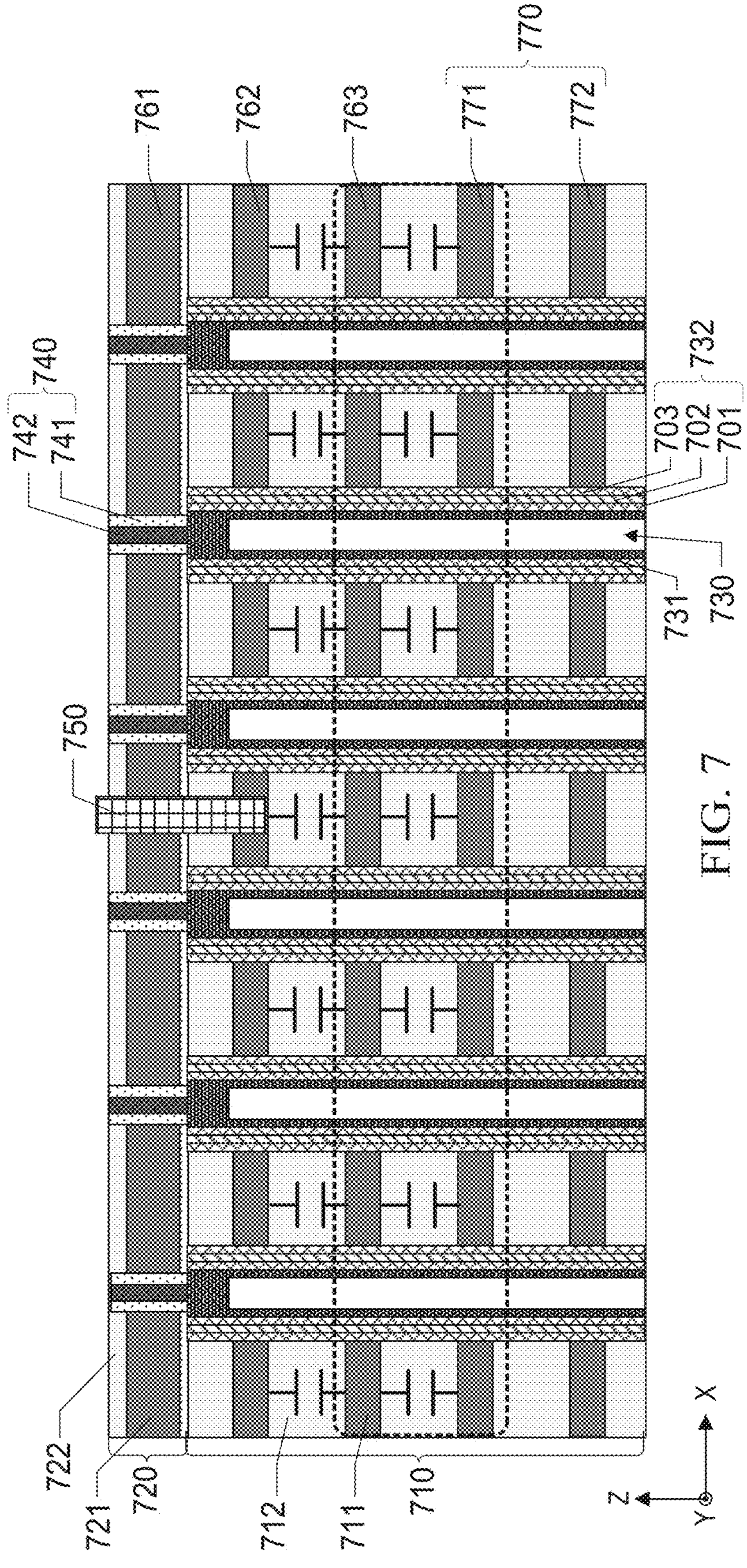
FIG. 7 is a schematic structural diagram of another memory cell array provided by examples of the present disclosure.

In some examples, in order to increase an arrangement density of the memory cell array, a process structure in which a stack layer of top select transistors is independent from a stack layer of memory cells may be employed. FIG. 7 is a schematic structural diagram of another memory cell array provided by examples of the present disclosure. As shown in FIG. 7, the stack layer comprise a first stack sub-layer 710 and a second stack sub-layer 720 on the first stack sub-layer 710, wherein the first stack sub-layer 710 comprises first gate conductive layers 711 and first dielectric layers 712 stacked alternately along the vertical direction, and the second stack sub-layer 720 comprises second gate conductive layers 721 and second dielectric layers 722 stacked sequentially along the vertical direction. Materials of the second gate conductive layer 721 and the first gate conductive layer 711 may be the same or different. The materials of the first gate conductive layer 711 and the second gate conductive layer 721 are the same as a material of the above-mentioned gate conductive layer 611, which is thus not repeated. Materials of the second dielectric layer 722 and the first dielectric layers 712 may be the same or different.

As shown in FIG. 7, the channel structure comprises a first channel sub-structure 730 and a second channel sub-structure 740, wherein the first channel sub-structure 730 is disposed in the first stack sub-layer 710 and extends along the vertical direction, the second channel sub-structure 740 is disposed in the second stack sub-layer 720 and extends in the vertical direction, a bottom of the second channel sub-structure 740 is in contact with the top of the first channel sub-structure 730, and the second channel sub-structure 740 is different from the first channel sub-structure 730.

In an example, the first channel sub-structure 730 comprises a first channel 731, and a memory film 732 surrounding the first channel 731. In an example, a material of the first channel 731 comprises silicon, e.g., polysilicon. The memory film 732 comprises a tunneling layer 701, a charge trapping layer 702 and a blocking layer 703 disposed sequentially from a center of the first channel 731 outward. In an example, the memory film 732 may be a composite layer composed of silicon oxide/silicon oxynitride/silicon oxide (ONO). The second channel sub-structure 740 comprises a second channel 741, and a gate oxidization layer 742 surrounding the second channel 741. In an example, a material of the second channel 741 comprises silicon, e.g., polysilicon. A material of the gate oxidization layer 742 comprises silicon oxide, silicon oxynitride, a high dielectric constant (high-k) dielectric, or any combination thereof.

The second stack sub-layer 720 and the second channel sub-structure 740 are used to form the top select transistor and the top select gate line. In some examples, the memory string may comprise a plurality of top select transistors including a coarse top select transistor (coarse TSG), a buffer top select transistor (buffer TSG) and a fine top select transistor (fine TSG). The coarse top select transistor is located in the second stack sub-layer 720, and the buffer top select transistor and the fine top select transistor are located in the first stack sub-layer 710.

The memory cell array further comprises a top select gate cut line 750 that vertically extends to cut the second gate conductive layer 721 into a plurality of regions each being used to form one coarse top select gate line 761, and the coarse top select gate line 761 is coupled to the coarse top select transistor. The top select gate cut line 750 may also extend to the topmost first gate conductive layer 711 of the first stack sub-layer 710 to cut it into a plurality of regions each being used to form a buffer top select gate line 762, and the buffer top select gate line 762 is coupled to the buffer top select transistor. The sub-top first gate conductive layer 711 of the first stack sub-layer 710 is used to form a fine top select gate line 763 that is coupled to the fine top select transistor. The fine top select gate line 763 is not cut by the top select gate cut line 750, and is coupled to the fine top select transistors of all the memory strings in an entire memory block.

In the memory cell array shown in FIG. 6, a facing area of each top select gate line 630 and the word line 650 is one region of the memory block, e.g., the region circled by each dashed box in FIG. 6. In the memory cell array shown in FIG. 7, a facing area of the fine top select gate line 763 and the word line 770 is an area of an entire memory block. Compared with FIG. 6, the facing area between the fine top select gate line 763 and the word line 770 increases, such that coupling capacitance therebetween increases.

Figure 8:
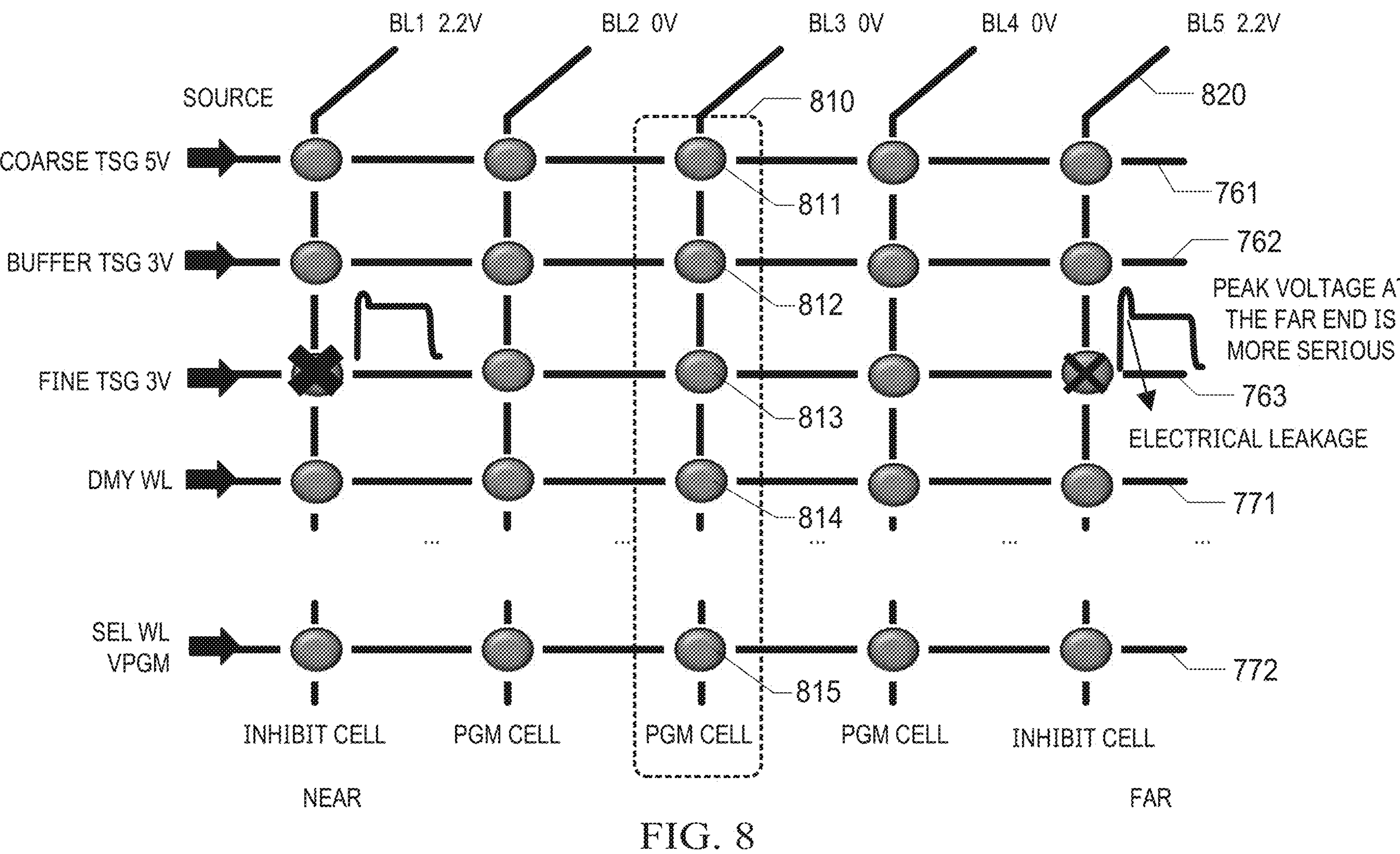
FIG. 8 is a schematic circuit diagram of a memory cell array provided by examples of the present disclosure.
Figure 9:
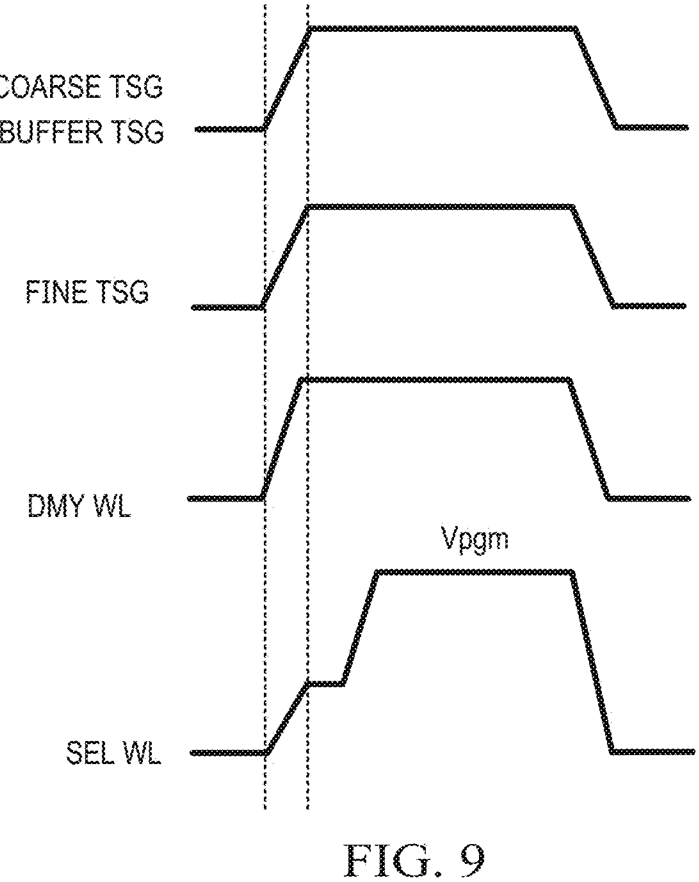
FIG. 9 is a timing diagram of a plurality of signals of a memory in a program operation provided by examples of the present disclosure.

FIG. 8 is a schematic circuit diagram of a memory cell array provided by examples of the present disclosure, and FIG. 9 is a timing diagram of a plurality of signals of a memory in a program operation provided by examples of the present disclosure. A procedure of a program operation is illustrated below in conjunction with FIGS. 8 and 9.

As shown in FIG. 8, the memory cell array comprises a plurality of memory strings 810. An upper end of each memory string 810 is connected with a BL 820, and each memory string 810 comprises a plurality of top select transistors and a plurality of memory cells. In this example, the plurality of top select transistors comprise a coarse top select transistor 811, a buffer top select transistor 812 and a fine top select transistor 813, wherein the coarse top select transistor 811 is coupled to the coarse top select gate line 761, the buffer top select transistor 812 is coupled to the buffer top select gate line 762, and the fine top select transistor 813 is coupled to the fine top select gate line 763. The memory cells comprise a dummy memory cell 814 and a normal memory cell 815, wherein the dummy memory cell 814 is coupled to a dummy word line (DMY WL) 771, and the normal memory cell 815 is coupled to a normal word line 772. The dummy word line 771 is located between the fine top select gate line 763 and the normal word line 772, and the dummy word line 771 is adjacent to the fine top select gate line 763.

In a program operation, the row decoder/WL driver selects one normal word line according to a row address, and the selected normal word line is called a selected word line (Sel WL). The column decoder/BL driver selects one or more bit lines according to a column address, and the selected bit lines are called selected bit lines. In a program operation, the selected coarse top select gate line is called a selected coarse select gate line. The fine top select gate line is coupled to all fine top select transistors in an entire memory block, and is applied with a select voltage in the program operation to turn on the fine top select transistors.

As shown in FIG. 9, during the program process, a program voltage ($V_{pgm}$) is applied to the selected word line (Sel WL). At the same time instant of applying the program voltage to the selected word line, a dummy voltage is applied to the dummy word line (DMY WL), a first select voltage is applied to a selected coarse top select gate line (coarse TSG), a second select voltage is applied to the buffer top select gate line (buffer TSG), and a third select voltage is applied to the fine top select gate line (fine TSG).

In an example, as shown in FIG. 8, the first select voltage applied to the selected coarse top select gate line during the program process is 5 V. A program permit voltage is applied to the selected bit line, and is, for example, a ground voltage (0 V). The memory string coupled with both the selected coarse top select gate line and the selected bit line is a selected memory string. During the program process, a program inhibit voltage is applied to the unselected bit line, and is, for example, 2.2 V. The memory string coupled with both the unselected bit line and the selected coarse top select gate line is an unselected memory string. Since the first select voltage applied to the selected coarse top select gate line is large, a difference between the first select voltage and the program inhibit voltage applied to the unselected bit line may be greater than a threshold voltage of the coarse top select transistor, such that the coarse top select transistor of the unselected memory string is turned on, resulting in electrical leakage of the unselected memory string. However, the third select voltage applied to the fine top select gate line during the program process is 3 V, a difference with the program inhibit voltage applied to the unselected bit line is small, thereby failing to turn on the fine top select transistor, and therefore, the probability of the electrical leakage of the unselected memory string may be reduced.

As the coupling capacitance between the fine top select gate line and the dummy word line increases, a coupling effect of the dummy voltage applied to the dummy word line on the fine top select gate line during the program process will increase, resulting in a transient high voltage coupled on the fine top select gate line. As shown in FIG. 8, a voltage of the fine top select gate line presents a voltage spike after reaching the third select voltage. Especially for the memory string away from the row decoder/WL driver, due to the impact of RC delay (resistance-capacitance delay), a voltage value of the voltage spike is greater.

During the program process, since the voltage of the fine top select gate line presents the voltage spike, it is possible that at the time instant that the voltage spike occurs, a voltage difference between the voltage of the fine top select gate line and the voltage of the unselected bit line is greater than the threshold voltage of the fine top select transistor, such that electrical leakage occurs in the unselected memory string, resulting in a serious program crosstalk problem.

Figure 10:
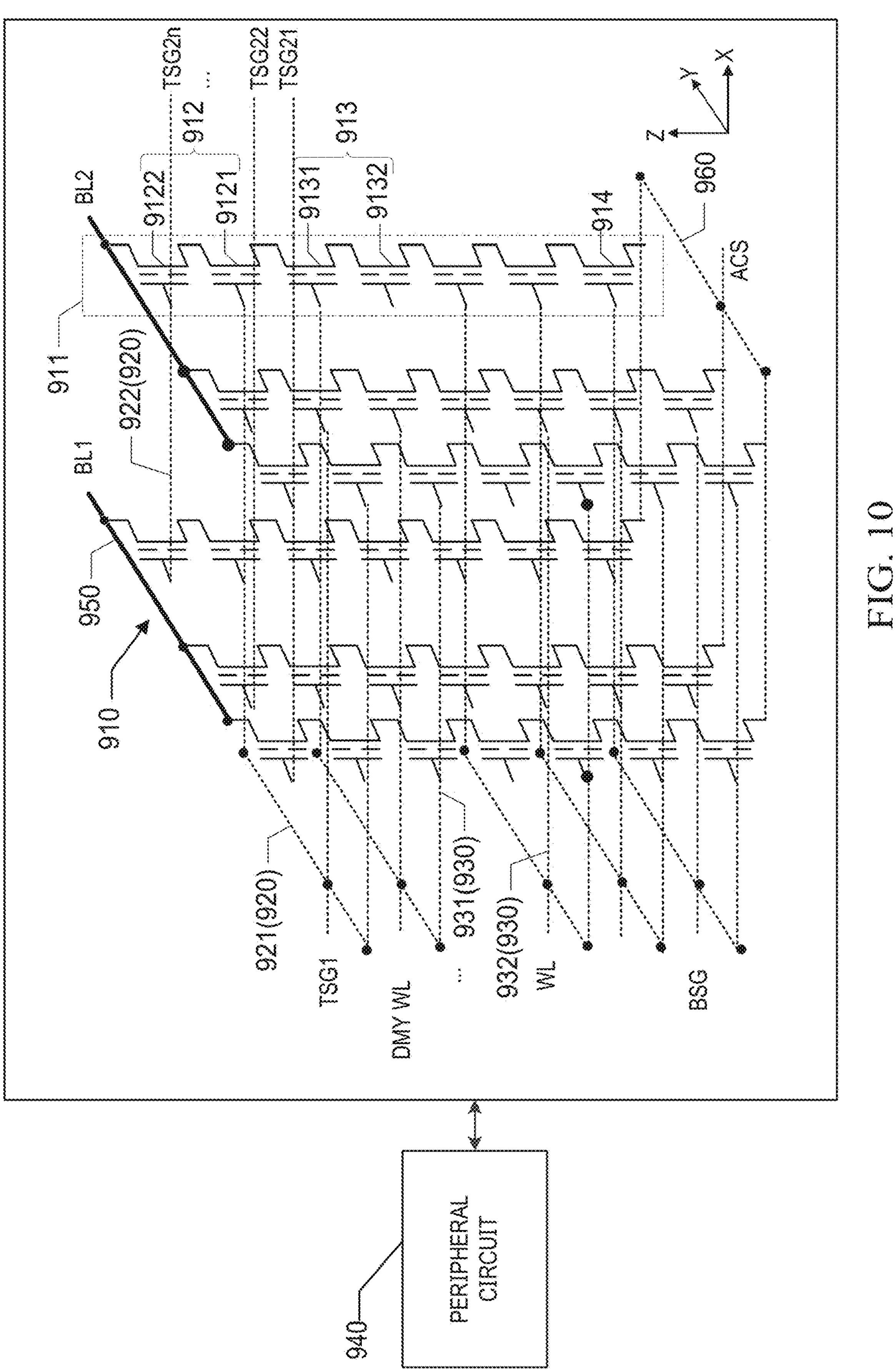
FIG. 10 is a schematic diagram of a memory provided by examples of the present disclosure.

In order to reduce the coupling effect of the dummy word line on the fine top select gate line during the program process, so as to reduce the program crosstalk, examples of the present disclosure further provide a memory. FIG. 10 is a schematic diagram of a memory provided by examples of the present disclosure. As shown in FIG. 10, the memory comprises a memory cell array 910, a plurality of top select gate lines 920, a plurality of word lines 930 and a peripheral circuit 940, wherein the memory cell array 910 comprises a plurality of memory strings 911, wherein the memory string 911 comprises a plurality of top select transistors 912 and a plurality of memory cells 913, and the plurality of top select transistors 912 are located on a side of the plurality of memory cells 913; the plurality of top select gate lines 920 are coupled to the plurality of top select transistors 912, and the plurality of word lines 930 are coupled to the plurality of memory cells 913; the peripheral circuit 940 is coupled to the top select gate lines 920 and the word lines 930, and is configured to: apply a first pulse to a first word line 931 of the plurality of word lines 930, such that a voltage of the first word line 931 reaches a first target voltage at a first time instant; and apply a second pulse to a first top select gate line 921 of the plurality of top select gate lines 920 adjacent to the first word line 931, such that a voltage of the first top select gate line 921 reaches a second target voltage at a second time instant, wherein the second time instant is later than the first time instant.

As shown in FIG. 10, the memory cell array 910 comprises a plurality of memory strings 911, wherein an upper end of each memory string 911 is coupled to a BL 950, and a lower end is coupled to an array common source (ACS) 960. The memory string 911 comprises a plurality of top select transistors 912, a plurality of memory cells 913 and a bottom select transistor 914 that are sequentially connected in series. The plurality of memory strings 911 are arranged in an array along a first direction and a second direction, and the first direction and the second direction intersect and are both perpendicular to an extending direction of the memory string. In an example, the first direction is an X direction, the second direction is a Y direction, and the extending direction of the memory string 911 is a Z direction.

The plurality of top select transistors of the memory string 911 comprise a first top select transistor 9121 that is adjacent to the memory cell 913, wherein the top select gate line coupled with the first top select transistor 9121 is the first top select gate line (TSG1) 921 that is adjacent to the word line 930. Here, the first top select transistor 9121 is the above-mentioned fine top select transistor. The plurality of top select transistors further comprise a second top select transistor 9122 that is away from the memory cell, wherein the plurality of top select gate lines coupled with the second top select transistor 9122 are second top select gate lines (TSG21, TSG22, . . . , TSG**2*n*) 922 that are away from the word line 930. The second top select transistor 9122** may be the above-mentioned coarse top select transistor.

As shown in FIG. 10, the second top select gate lines 922 may extend along the first direction (the X direction), and be coupled with gates of the second top select transistors 9122 of the plurality of memory strings arranged in juxtaposition along the first direction. The bit line 950 extends along the second direction (the Y direction), and is coupled with upper ends of the plurality of memory strings arranged in juxtaposition along the second direction. By controlling the voltage applied to the bit line 950 and the second top select gate lines 922, a certain memory string may be selected to perform the program and read operations on any one of the memory cells in the selected memory string. The first top select gate line 921 extends along a plane where the first direction and the second direction are located, and is coupled with the first top select transistor 9121 in each memory string. The word line 930 also extends along the plane where the first direction and the second direction are located, and is coupled with a gate of one memory cell 913 in each memory string. The plurality of word lines 930 are disposed in juxtaposition along an extending direction (the Z direction) of the memory string 911 so as to be coupled with the plurality of memory cells 913 in the memory string 911 in one-to-one correspondence.

Figure 11:
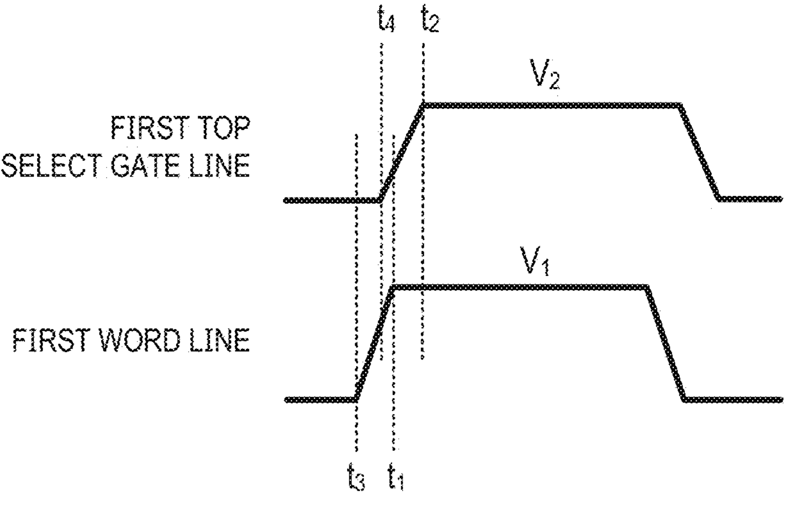
FIG. 11 is a voltage timing diagram of a first word line and a first top select gate line in a program operation provided by examples of the present disclosure.

The plurality of word lines 930 comprise a first word line 931 adjacent to the top select gate line, and the first word line 931 is adjacent to the first top select gate line 921. FIG. 11 is a voltage timing diagram of a first word line and a first top select gate line in a program operation provided by examples of the present disclosure. As shown in FIG. 11, during the program process, a first pulse is applied to the first word line, and a voltage of the first word line reaches a first target voltage $V_1$ at a first time instant $t_1$. Here, the first target voltage $V_1$ is a peak voltage of the first pulse. A second pulse is applied to the first top select gate line adjacent to the first word line, and a voltage of the first top select gate line reaches a second target voltage $V_2$ at a second time instant $t_2$. Here, the second target voltage $V_2$ is a peak voltage of the second pulse. The second time instant $t_2$ is later than the first time instant $t_1$, such that when the voltage of the first word line reaches the first target voltage $V_1$, the voltage of the first top select gate line is still a low voltage or at a rising edge from the low voltage to the second target voltage $V_2$. A coupling effect of the voltage of the first word line on the first top select gate line will lead to a voltage spike occurring when the voltage of the first top select gate line is at the low voltage or the rising edge, while the voltage spike does not occur when the first top select gate line is at the second target voltage $V_2$, such that a voltage value of the voltage spike is reduced, and a difference between the voltage value of the voltage spike and a voltage value of the bit line is not enough to turn on the first top select transistor, which reduces the probability that the unselected memory string is turned on, thereby reducing the probability of program crosstalk.

In order to make the second time instant $t_2$ be later than the first time instant $t_1$, in some examples, as shown in FIG. 11, the peripheral circuit is configured to: apply the first pulse to the first word line at a third time instant $t_3$; and apply a second pulse to the first top select gate line at a fourth time instant $t_4$, wherein the fourth time instant $t_4$ is later than the third time instant $t_3$.

As shown in FIG. 11, the third time instant $t_3$ is a starting time instant of the first pulse, the first time instant $t_1$ is a time instant when the first pulse reaches its peak voltage, a procedure that the first pulse reaches its peak voltage from the start is called a rising edge of the first pulse, and a period from the third time instant $t_3$ to the first time instant $t_1$ is a duration of the rising edge of the first pulse, which may be also referred to as a rising time of the first pulse. From the third time instant $t_3$, the voltage of the first word line transits from the low voltage to the first target voltage $V_1$, and at the first time instant $t_1$ after a period of time, the voltage of the first word line reaches the first target voltage $V_1$.

The fourth time instant $t_4$ is a starting time instant of the second pulse, the second time instant $t_2$ is a time instant that the second pulse reaches its peak voltage, a procedure that the second pulse reaches its peak voltage from the start is called a rising edge of the second pulse, and a period from the fourth time instant $t_4$ to the second time instant $t_2$ is a duration of the rising edge of the second pulse, which may be also referred to as a rising time of the second pulse. From the fourth time instant $t_4$, the voltage of the first top select gate line transits from the low voltage to the second target voltage $V_2$, and at the second time instant $t_2$ after a period of time, the voltage of the first top select gate line reaches the second target voltage $V_2$.

In this example, the fourth time instant $t_4$ is later than the third time instant $t_3$, and the duration of the rising edge of the second pulse may be less than or equal to the duration of the rising edge of the first pulse to ensure that the second time instant $t_2$ that the first top select gate line reaches the second target voltage $V_2$ is later than the first time instant $t_1$ that the first word line reaches the first target voltage $V_1$, thereby improving the program crosstalk caused by electrical leakage of the unselected memory string.

In order to make the second time instant $t_2$ be later than the first time instant $t_1$, in yet another example, the peripheral circuit is configured to: apply the second pulse to the first top select gate line at the same time instant of applying the first pulse to the first word line, wherein the duration of the rising edge of the second pulse is greater than the duration of the rising edge of the first pulse.

Figure 12:
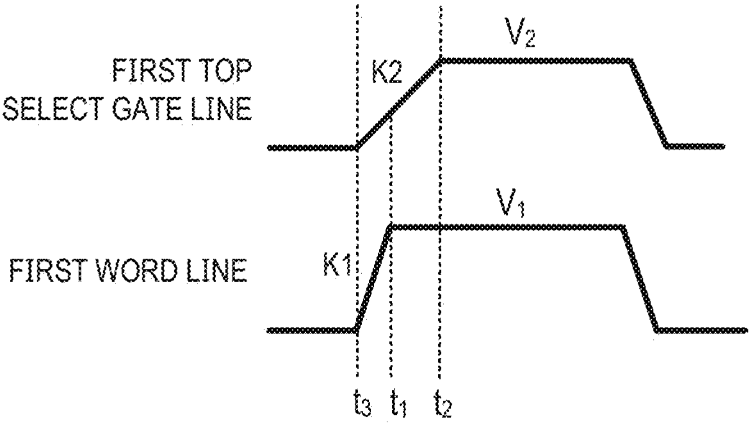
FIG. 12 is another voltage timing diagram of a first word line and a first top select gate line in a program operation provided by examples of the present disclosure.

As shown in FIG. 12, at the same time instant, e.g., the third time instant $t_3$, the first pulse is applied to the first word line, and the second pulse is applied to the first top select gate line. Since the duration of the rising edge of the second pulse is greater than the duration of the rising edge of the first pulse, when the first word line reaches the first target voltage $V_1$ at the first time instant $t_1$, the voltage of the first top select gate line is still at a rising edge stage and does not reach the second target voltage $V_2$. At this point, due to the coupling effect of the voltage of the first word line, the voltage spike may occur in the first top select gate line at the rising edge stage, such that the voltage value of the voltage spike of the first top select gate line is reduced, which reduces the probability of electrical leakage of the unselected memory string, thereby improving the program crosstalk problem caused by the electrical leakage of the unselected memory string. The voltage of the first top select gate line reaches the second target voltage $V_2$ at the second time instant $t_2$ after the first time instant $t_1$.

In order to make the duration of the rising edge of the second pulse be greater than the duration of the rising edge of the first pulse, in some examples, as shown in FIG. 12, the rising edge of the first pulse has a first slope K1, and the rising edge of the second pulse has a second slope K2, wherein the second slope K2 is less than the first slope K1.

The rising edge of the first pulse has the first slope K1, that is, the voltage of the first word line varies linearly with time to the first target voltage $V_1$. The rising edge of the second pulse has the second slope K2, that is, the voltage of the first top select gate line varies linearly with time to the second target voltage $V_2$. In this example, the second slope K2 is less than the first slope K1, which means that the voltage of the first top select gate line varies more slowly, such that the time required by the first top select gate line to reach the second target voltage $V_2$ will be longer, and therefore, the second time instant $t_2$ that the second top select gate line reaches the second target voltage $V_2$ is later than the first time instant $t_1$ that the first word line reaches the first target voltage $V_1$. In an example, the second target voltage $V_2$ may be greater than, equal to or slightly less than the first target voltage $V_1$.

Figure 13:
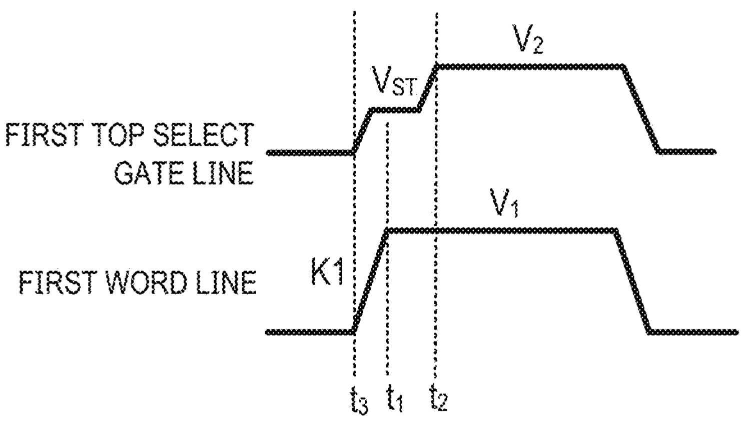
FIG. 13 is yet another voltage timing diagram of a first word line and a first top select gate line in a program operation provided by examples of the present disclosure.

In some examples, as shown in FIG. 13, the rising edge of the first pulse corresponding to the first word line has the first slope K1, and the second pulse corresponding to the first top select gate line is in a step-like waveform, wherein the rising edge of the second pulse comprises multiple steps.

The second pulse being in the step-like waveform refers to that the voltage of the second pulse rises to the second target voltage $V_2$ in multiple steps. In each step, the voltage of the second pulse first increases to a stage voltage, stays at the stage voltage for a period of time and then continues to increase, such that the rising edge of the second pulse is in the step-like waveform. In an example, as shown in FIG. 13, the rising edge of the second pulse comprises two steps. The voltage of the second pulse may first increase to a stage voltage $V_{ST}$, stays at the stage voltage for a period of time, and then continues to increase to the second target voltage $V_2$. The voltage of the second pulse is the voltage of the first top select gate line. In this example, the voltage of the first top select gate line increases to the second target voltage $V_2$ by means of gradually increasing the voltage of the first top select gate line in multiple steps, which can extend the duration of the rising edge of the second top select gate line, such that the voltage of the first top select gate line reaches the second target voltage $V_2$ later, and thus, the second time instant $t_2$ that the first top select gate line reaches the second target voltage $V_2$ is later than the first time instant $t_1$ that the first word line reaches the first target voltage $V_1$. In an example, a slope of a sub-rising edge of each step of the second pulse is equal to or less than the first slope K1. It should be understood that the slope of the sub-rising edge of at least one step of the second pulse may be also greater than the first slope K1, and the voltage of the first top select gate line can reach the second target voltage $V_2$ later by extending the residence time at the stage voltage.

It should be understood that in some examples, the methods employed by FIGS. 11 and 12 may be also combined, or the methods employed by FIGS. 11 and 13 may be combined. That is, the fourth time instant $t_4$ of applying the second pulse to the first top select gate line is later than the third time instant $t_3$ of applying the first pulse to the first word line, and at the same time, the duration of the rising edge of the second pulse is greater than the duration of the rising edge of the first pulse, such that the second time instant $t_2$ that the first top select gate line reaches the second target voltage $V_2$ is later than the first time instant $t_1$ that the first word line reaches the first target voltage $V_1$, thereby improving the program crosstalk problem caused by electrical leakage of the unselected memory string.

Referring back to FIG. 9, in some examples, the plurality of word lines 930 comprises a dummy word line DMY WL and a normal word line WL, wherein the dummy word line DMY WL is located between the normal word line WL and the first top select gate line 921. The number of the dummy word line DMY WL may be one or more. The first word line 931 is the dummy word line DMY WL adjacent to the top select gate line 920. The plurality of memory cells 913 comprise a dummy memory cell 9131 and a normal memory cell 9132, wherein the dummy word line DMY WL is coupled with the dummy memory cell 9131, and the normal word line WL is coupled with the normal memory cell 9132.

One of the functions of the dummy memory cell 9131 coupled with the dummy word line is to protect the normal memory cell 9132 at an edge coupled with the normal word line, such that the normal memory cell at the edge has the same surrounding environment as other normal memory cells, so as to increase the data access accuracy of the normal memory cell at the edge. The dummy memory cell is not used for storing data, and the data is stored in the normal memory cell.

Figure 14:
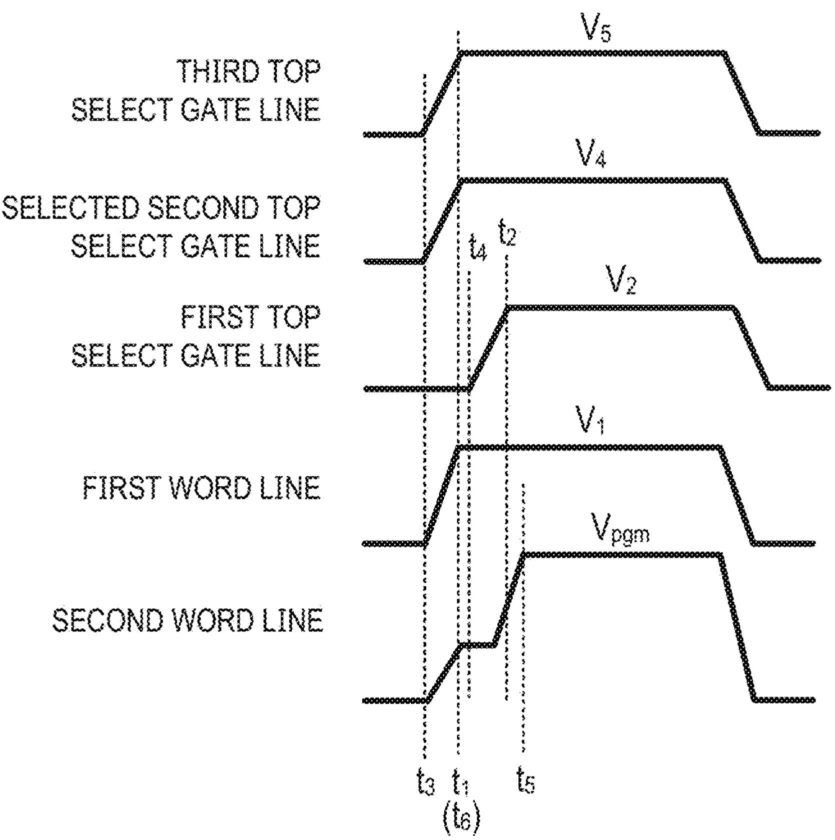
FIG. 14 is a timing diagram of a plurality of signals in a program operation provided by examples of the present disclosure.

In some examples, as shown in FIGS. 10 and 14, during the program operation, the peripheral circuit is further configured to: apply the third pulse to a second word line 932 of the plurality of normal word lines, such that the second word line 932 reaches the third target voltage at a fifth time instant $t_5$, wherein the fifth time instant $t_5$ is not earlier than the second time instant $t_2$.

Here, the fifth time instant $t_5$ being not earlier than the second time instant $t_2$ comprises the fifth time instant $t_5$ being at the same time as the second time instant $t_2$, or the fifth time instant $t_5$ being later than the second time instant $t_2$.

The second word lines 932 are selected word lines (Sel WL) of the plurality of normal word lines, and the normal memory cells coupled with the second word lines 932 are used to store data in the program operation. The third pulse is applied to the second word line, and the second word line reaches the third target voltage at the fifth time instant $t_5$. Here, the third target voltage is a peak voltage of the third pulse, e.g., a program voltage $V_{pgm}$. After the voltage of the second word line reaches the program voltage $V_{pgm}$, electrons may be trapped to the charge trapping layer for data storage.

The voltage of the second word line 932 reaches the program voltage $V_{pgm}$ at the fifth time instant $t_5$, the fifth time instant $t_5$ is not earlier than the second time instant $t_2$, that is, at the same time as or after the voltage of the first word line 931 reaches the first target voltage $V_1$ and the voltage of the first top select gate line 921 reaches the second target voltage $V_2$, the voltage of the second word line 932 reaches the program voltage $V_{pgm}$. This is because the voltage of the first top select gate line 921 decides which memory strings are selected and which memory strings are not selected. Only after the selected memory strings are determined, the voltage of the second word line 932 reaches the program voltage $V_{pgm}$, which can avoid program crosstalk caused by the unselected memory strings being programmed.

In some examples, the peripheral circuit is configured to: apply the third pulse to the second word line at the same time instant as applying the first pulse to the first word line or at the same time instant as applying the second pulse to the first top select gate line, wherein a duration of a rising edge of the third pulse is greater than a duration of a rising edge of the second pulse.

In an example, as shown in FIG. 14, at the third time instant $t_3$, the first pulse is applied to the first word line, and at the same time, the third pulse is applied to the second word line, and at the fourth time instant $t_4$ after the third time instant $t_3$, the second pulse is applied to the first top select gate line. Here, a procedure that the third pulse reaches its peak voltage (e.g., the program voltage $V_{pgm}$) from the start is called the rising edge of the third pulse, and a period from the third time instant $t_3$ to the fifth time instant $t_5$ is the duration of the rising edge of the third pulse, which may be also referred to as a rising time of the third pulse. In an example, as shown in FIG. 14, the third pulse may be in a step-like waveform.

Since the duration of the rising edge of the third pulse is much greater than the duration of the rising edge of the second pulse, although the time instant of applying the third pulse to the second word line is earlier than the time instant of applying the second pulse to the first top select gate line, the fifth time instant $t_5$ that the second word line reaches the third target voltage (e.g., the program voltage $V_{pgm}$) may be the same as or later than the second time instant $t_2$ that the first top select gate line reaches the second target voltage $V_2$.

Figure 15:
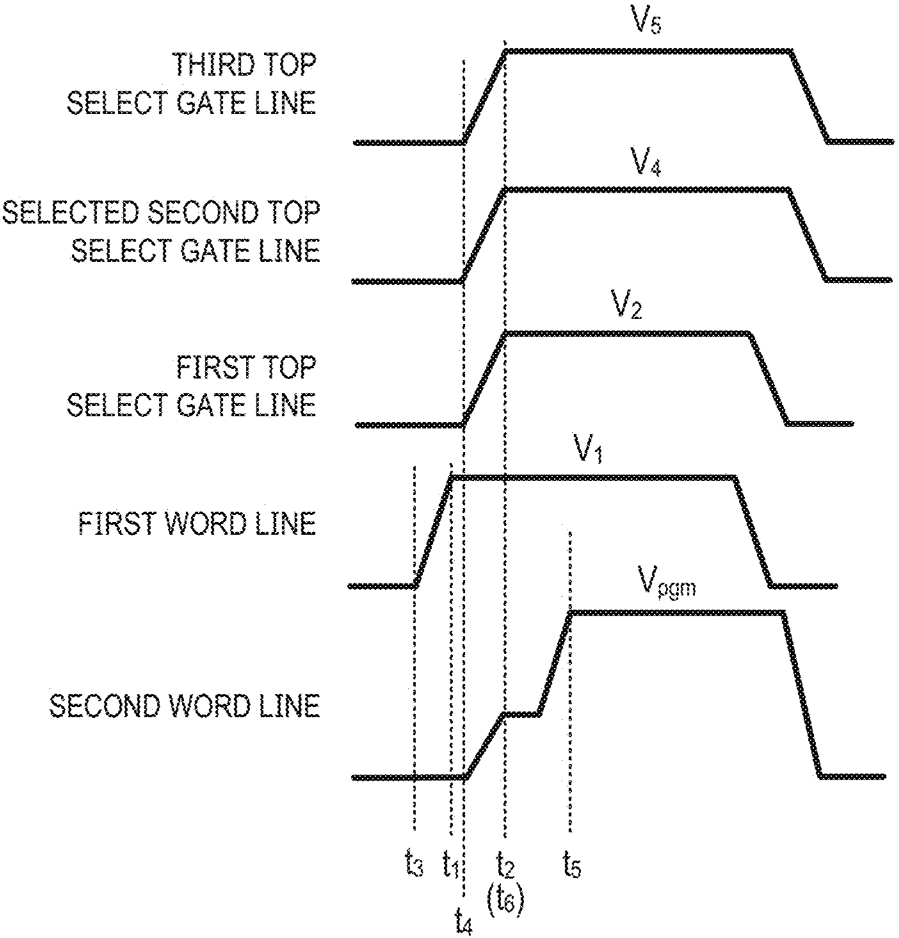
FIG. 15 is another timing diagram of a plurality of signals in a program operation provided by examples of the present disclosure.

In another example, as shown in FIG. 15, at the third time instant $t_3$, the first pulse is applied to the first word line; at the fourth time instant $t_4$ after the third time instant $t_3$, the second pulse is applied to the first top select gate line, and at the same time, the third pulse is applied to the second word line. Since the duration of the rising edge of the third pulse is greater than the duration of the rising edge of the second pulse, the fifth time instant $t_5$ that the second word line reaches the third target voltage is later than the second time instant $t_2$ that the first top select gate line reaches the second target voltage $V_2$. In yet another example, when the second pulse is applied to the first top select gate line and the third pulse is applied to the second word line at the same time, if the duration of the rising edge of the third pulse is equal to the duration of the rising edge of the second pulse, the fifth time instant $t_5$ that the second word line reaches the third target voltage may be equal to the second time instant $t_2$ that the first top select gate line reaches the second target voltage $V_2$.

Figure 16:
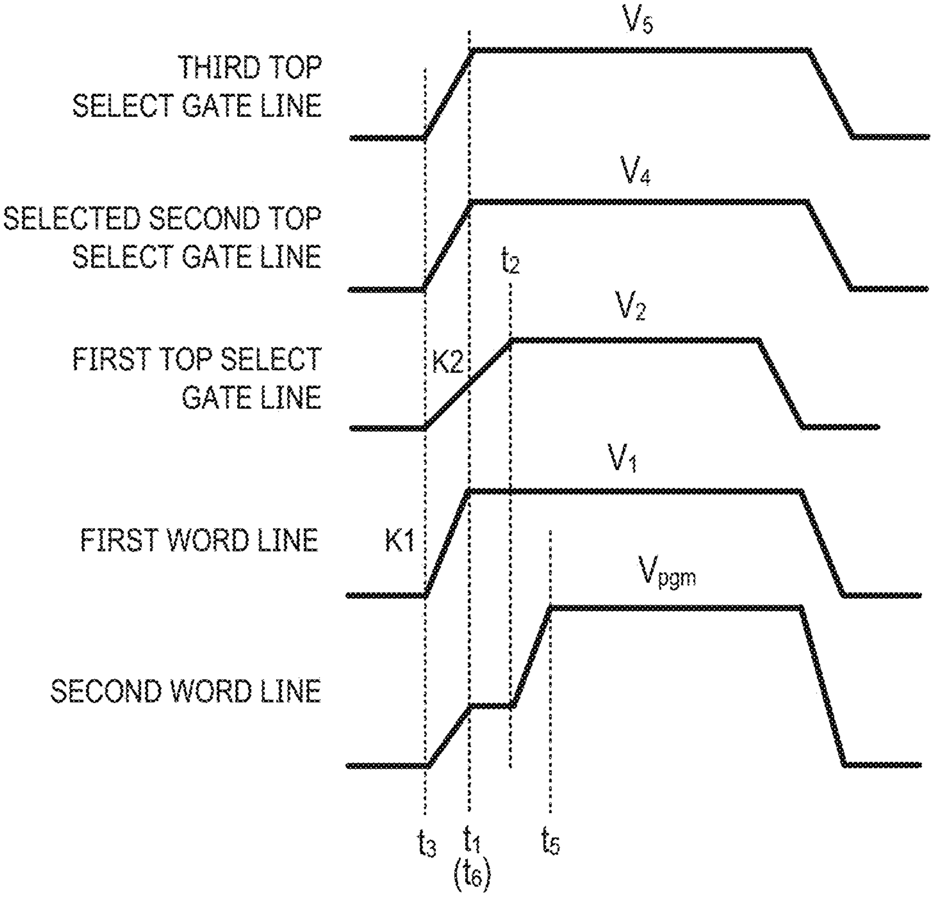
FIG. 16 is yet another timing diagram of a plurality of signals in a program operation provided by examples of the present disclosure.
Figure 17:
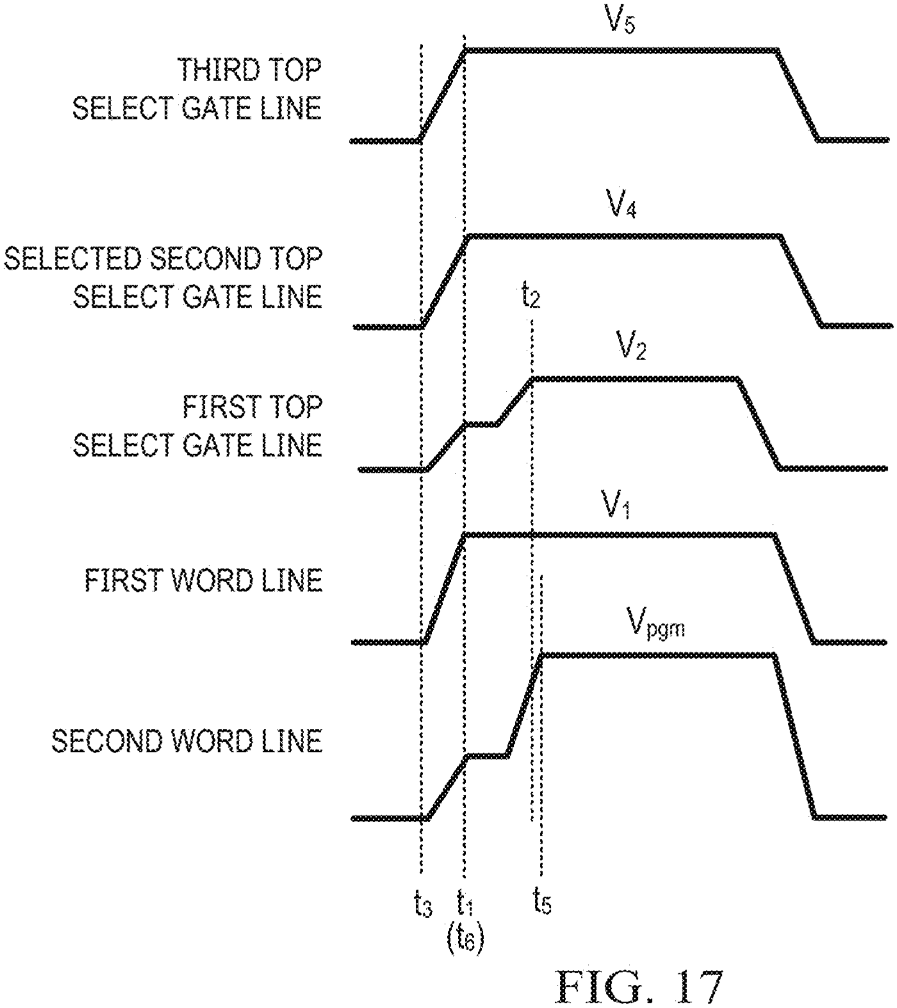
FIG. 17 is still another timing diagram of a plurality of signals in a program operation provided by examples of the present disclosure.

In some other examples, as shown in FIGS. 16 and 17, at the same time instant, for example the third time instant $t_3$, the first pulse is applied to the first word line, the second pulse is applied to the first top select gate line, and the third pulse is applied to the second word line, and the third pulse is in a step-like waveform. Since the duration of the rising edge of the second pulse is greater than the duration of the rising edge of the first pulse, and less than the duration of the rising edge of the third pulse, the second time instant $t_2$ is later than the first time instant $t_1$, and the fifth time instant $t_5$ is later than the second time instant $t_2$. The specific form of the second pulse is not limited by the present disclosure.

In an example, as shown in FIG. 16, the second slope K2 of the rising edge of the second pulse is less than the first slope K1 of the rising edge of the first pulse, such that the rising edge of the second pulse is staggered from the rising edge of the first pulse, and the rising edge of the second pulse varies more slowly, such that the second time instant $t_2$ is later than the first time instant $t_1$. The third pulse is in a step-like waveform, and the rising edge of the third pulse comprises multiple steps, which can extend the duration of the rising edge of the third pulse, such that the fifth time instant $t_5$ is not earlier than the second time instant $t_2$.

In another example, as shown in FIG. 17, the second pulse applied to the first top select gate line and the third pulse applied to the second word line may be both in a step-like waveform, but the duration of the rising edge of the third pulse may be equal to or greater than the duration of the rising edge of the second pulse, such that the fifth time instant $t_5$ is not earlier than the second time instant $t_2$.

Referring back to FIG. 10, the plurality of top select transistors 912 in the memory string comprise the first top select transistor 9121 close to the dummy memory cell 9131 and the second top select transistor 9122 away from the dummy memory cell 9131, wherein the first top select gate line 921 extends along the first direction and the second direction and is coupled to the first top select transistor 9121 of each of the plurality of memory strings. In other words, the first top select gate line 921 is coupled to the first top select transistor 9121 of each of all the memory strings in an entire memory block. The second top select gate line 922 may extend along the first direction (X direction) and be coupled to the second top select transistors of the plurality of memory strings disposed in juxtaposition along the first direction, and the plurality of second top select gate lines 922 are disposed in juxtaposition along the second direction (Y direction).

During the program process, as shown in FIGS. 14 to 17, the peripheral circuit is further configured to: apply a fourth pulse to a selected second top select gate line of the plurality of second top select gate lines 922, such that the selected second top select gate line reaches a fourth target voltage $V_4$ at a sixth time instant to, wherein the sixth time instant to is not later than the second time instant $t_2$, and the fourth target voltage $V_4$ is greater than the second target voltage $V_2$.

Here, the fourth target voltage $V_4$ is a peak voltage of the fourth pulse. In order to make the sixth time instant to be not later than the second time instant $t_2$, in some examples, as shown in FIGS. 14, 16 and 17, at the same time instant of applying the first pulse to the first word line, for example the third time instant $t_3$, the fourth pulse is applied to the selected second top select gate line, wherein a duration of a rising edge of the fourth pulse is equal to the duration of the rising edge of the first pulse, such that the sixth time instant to that the selected second top select gate line reaches the fourth target voltage $V_4$ and the first time instant $t_1$ that the first word line reaches the first target voltage $V_1$ are the same and are both earlier than the second time instant $t_1$.

In some other examples, as shown in FIG. 15, at the same time instant of applying the second pulse to the first top select gate line, the fourth pulse is applied to the selected second top select gate line, wherein the duration of the rising edge of the fourth pulse is equal to the duration of the rising edge of the second pulse, such that the sixth time instant to that the selected second top select gate line reaches the fourth target voltage $V_4$ is the same as the second time instant $t_2$ that the first top select gate line reaches the second target voltage $V_2$.

In this example, the fourth target voltage $V_4$ of the selected second top select gate line is greater than the second target voltage $V_2$ of the first top select gate line. During the program process, the greater fourth target voltage $V_4$, e.g., 5 V, is applied to the selected second top select gate line; a program permit voltage, for example, a ground voltage (0 V), is applied to the selected bit line; and the memory string coupled with the selected second top select gate line and the selected bit line is a selected memory string. During the program process, a program inhibit voltage, e.g., 2.2 V, is applied to the unselected bit line; and the memory string coupled with the selected second top select gate line and the unselected bit line is an unselected memory string.

During the program process, since the fourth target voltage $V_4$ of the selected second top select gate line is large, a difference with the program inhibit voltage of the unselected bit line May be greater than a threshold voltage of the second top select transistor, resulting in possible electrical leakage of the unselected memory string. However, the second target voltage applied to the first top select gate line during the program process is small, for example, 3 V, and a difference between the second target voltage and the voltage of the unselected bit line is small, thereby failing to turn on the first top select transistor, and thus, the probability of the electrical leakage of the unselected memory string may be reduced.

In addition, the cooperation of the first top select gate line and the second top select gate line may enable to program by selecting a half page or a quarter page from a selected page, thereby providing more program methods.

In some examples, the plurality of top select transistors comprise a third top select transistor located between the first top select transistor and the second top select transistor, wherein the third top select transistor is coupled to a third top select gate line. The third top select gate line may be the topmost first gate conductive layer in the first stack sub-layer in FIG. 7, the third top select transistor is for example the above-mentioned buffer top select transistor (buffer TSG), and the third top select gate line is correspondingly a buffer top select gate line. The third top select gate line plays a role of buffering in process. In an example, as shown in FIG. 7, the top select gate cut line 750 may extend from the second stack sub-layer 720 to the first stack sub-layer 710, and may damage the first channel sub-structure 730. If the first top select gate line is formed using the topmost first gate conductive layer 711 in the first stack sub-layer 710, the damaged channel structure will affect the performance of the first top select transistor. Therefore, the third top select gate line disposed on the first top select gate line plays the role of buffering in process, so as to ensure that the first top select gate line and the first top select transistor function normally.

As shown in FIGS. 14 to 17, a fifth pulse is applied to the third top select gate line, a time instant that the fifth pulse is applied to the third top select gate line is the same as the time instant that the fourth pulse is applied to the selected second top select gate line, and a time instant that the third top select gate line reaches a fifth target voltage $V_5$ is also the same as the sixth time instant to that the selected second top select gate line reaches the fourth target voltage $V_4$.

In an example, the fifth target voltage $V_5$ is equal to the second target voltage $V_2$. For example, the fifth target voltage $V_5$ and the second target voltage $V_2$ are both 3 V.

In an example, the first target voltage is greater than 3 V.

When the memory provided by the examples of the present disclosure performs the program operation, the first pulse is applied to the first word line of the plurality of word lines adjacent to the top select gate line, and the second pulse is applied to the first top select gate line of the plurality of top select gate lines adjacent to the first word line, wherein the second time instant that the first top select gate line reaches the second target voltage is later than the first time instant that the first word line reaches the first target voltage. In other words, when the first word line reaches the first target voltage at the first time instant, the second pulse may be not applied to the first top select gate line yet, or the voltage of the first top select gate line is still at the rising edge stage and does not reach the second target voltage, and at this time, due to the coupling effect of the voltage of the first word line, the voltage spike may occur in the first top select gate line before the rising edge stage or at the rising edge stage. Since the voltage value of the voltage spike occurring at this time is small, and even possibly less than the second target voltage, the probability of the electrical leakage of the unselected memory string may be reduced, thereby improving the program crosstalk problem caused by the electrical leakage of the unselected memory string.

Figure 18:
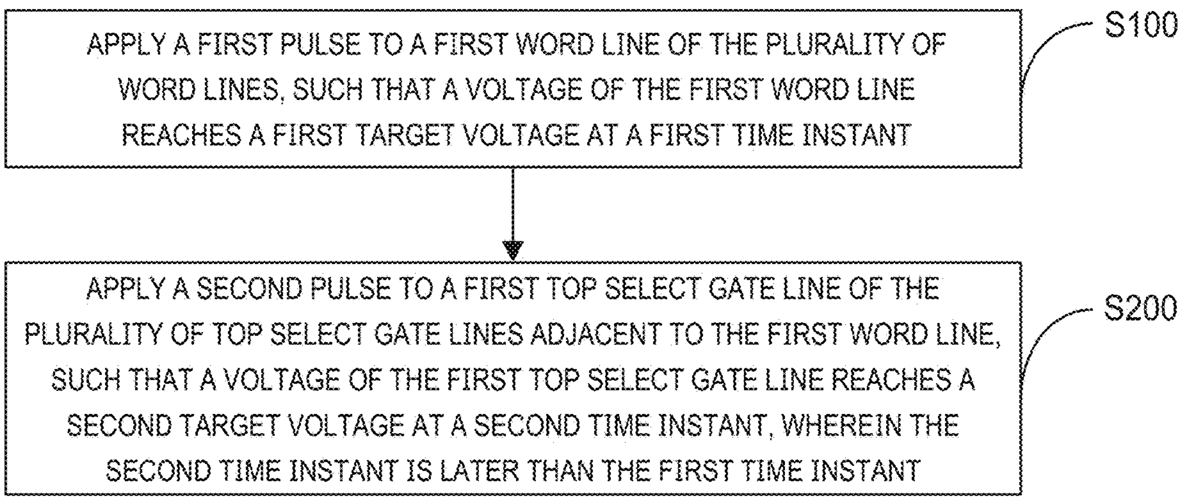
FIG. 18 is a schematic flow diagram of an operation method of a memory provided by examples of the present disclosure.

Examples of the present disclosure further provide an operation method of a memory. FIG. 18 is a schematic flow diagram of an operation method of a memory provided by examples of the present disclosure. The memory comprises a memory cell array and a peripheral circuit coupled to the memory cell array, wherein the memory cell array comprises a plurality of memory strings, the memory string comprises a plurality of memory cells and a plurality of top select transistors on a side of the plurality of memory cells, a plurality of word lines are coupled to the plurality of memory cells, and a plurality of top select gate lines are coupled to the plurality of top select transistors.

As shown in FIG. 18, the operation method comprises: S100: applying a first pulse to a first word line of the plurality of word lines adjacent to a top select gate line, such that a voltage of the first word line reaches a first target voltage at a first time instant; and S200: applying a second pulse to a first top select gate line of the plurality of top select gate lines adjacent to the first word line, such that a voltage of the first top select gate line reaches a second target voltage at a second time instant, wherein the second time instant is later than the first time instant.

In some examples, S100 comprises: applying the first pulse to the first word line at a third time instant; and S200 comprises: applying a second pulse to the first top select gate line at a fourth time instant, wherein the fourth time instant is later than the third time instant, such that the second time instant is later than the first time instant.

In some examples, S200 comprises: applying the second pulse to the first top select gate line at the same time instant as applying the first pulse to the first word line, wherein a duration of a rising edge of the second pulse is greater than a duration of a rising edge of the first pulse, such that the second time instant is later than the first time instant.

In some examples, in S100, the rising edge of the first pulse applied to the first word line has a first slope; and S200 comprises: applying the second pulse of which the rising edge has a second slope to the first top select gate line, wherein the second slope is less than the first slope, such that the duration of the rising edge of the second pulse is greater than the duration of the rising edge of the first pulse, thereby achieving that the second time instant is later than the first time instant.

In some examples, in S100, the rising edge of the first pulse applied to the first word line has a first slope; and S200 comprises: applying the second pulse in a step-like waveform to the first top select gate line, wherein the rising edge of the second pulse comprises multiple steps, such that the duration of the rising edge of the second pulse is greater than the duration of the rising edge of the first pulse, thereby achieving that the second time instant is later than the first time instant.

In some examples, the word lines comprise a normal word line and a dummy word line between the normal word line and the top select gate line, wherein the first word line is the dummy word line adjacent to the top select gate line; and the operation method further comprises: applying a third pulse to a second word line of the plurality of normal word lines, such that the second word line reaches the third target voltage at a fifth time instant, wherein the fifth time instant is not earlier than the second time instant.

In some examples, applying the third pulse to the second word line of the plurality of normal word lines comprises: applying the third pulse to the second word line at the same time instant as applying the first pulse to the first word line or at the same time instant as applying the second pulse to the first top select gate line, wherein a duration of a rising edge of the third pulse is greater than a duration of a rising edge of the second pulse, such that the fifth time instant is not earlier than the second time instant.

In some examples, the plurality of top select transistors in the memory string comprise a first top select transistor and a second top select transistor, wherein the first top select gate line is coupled to the first top select transistor of each of the plurality of memory strings. The top select gate line further comprises a plurality of second top select gate lines coupled to the second top select transistors of the plurality of memory strings, and different second top select gate lines are coupled to the second top select transistors of different memory strings; and the operation method further comprises: applying a fourth pulse to a selected second top select gate line of the plurality of second top select gate lines, such that the selected second top select gate line reaches a fourth target voltage at a sixth time instant, wherein the sixth time instant is not later than the second time instant, and the fourth target voltage is greater than the second target voltage.

In some examples, applying the fourth pulse to the selected second top select gate line of the plurality of second top select gate lines comprises: applying the fourth pulse to the selected second top select gate line at the same time instant as applying the first pulse to the first word line, wherein a duration of a rising edge of the fourth pulse is equal to a duration of a rising edge of the first pulse, such that the sixth time instant is earlier than the second time instant.

In some examples, applying the fourth pulse to the selected second top select gate line of the plurality of second top select gate lines may further comprise: applying the fourth pulse to the selected second top select gate line at the same time instant as applying the second pulse to the first top select gate line, wherein the duration of the rising edge of the fourth pulse is equal to or less than a duration of a rising edge of the second pulse, such that the sixth time instant is earlier than the second time instant.

According to the operation method of the memory provided by the examples of the present disclosure, the first pulse is applied to the first word line of the plurality of word lines adjacent to the top select gate line, and the second pulse is applied to the first top select gate line of the plurality of top select gate lines adjacent to the first word line, wherein the second time instant that the first top select gate line reaches the second target voltage is later than the first time instant that the first word line reaches the first target voltage, which can avoid the voltage spike occurring due to the coupling effect of the voltage of the first word line when the first top select gate line is at the second target voltage, thereby reducing the voltage value of the voltage spike, reducing the probability of electrical leakage of the unselected memory string, and improving the program crosstalk problem caused by the electrical leakage of the unselected memory string.

With respect to the method in the above examples, its specific implementation method has been described in detail in the examples of the product corresponding to the method, and will not be set forth and illustrated in detail here.

Examples of the present disclosure further provide a memory system comprising a memory and a memory controller coupled to the memory and configured to control the memory. The memory may be any of the above-mentioned memories and is used to implement the program operation method provided above in the examples of the present disclosure.

The above descriptions are merely implementations of the present disclosure, and the protection scope of the present disclosure is not limited thereto. Any variation or replacement that may be readily figured out by a person skilled in the art within the technical scope disclosed by the present disclosure shall fall within the protection scope of the present disclosure. Therefore, the protection scope of the present disclosure shall be defined by the protection scope of the claims.

What is claimed is:

1. A memory device, comprising:

a memory cell array comprising memory strings, wherein each of the memory strings comprises top select transistors and memory cells, and the top select transistors are located on a side of the memory cells;

top select gate lines coupled to the top select transistors;

word lines coupled to memory cells; and a peripheral circuit coupled to the top select gate lines and the word lines, and configured to:

apply a first pulse to a first word line of the word lines, such that a voltage of the first word line reaches a first target voltage at a first time instant; and apply a second pulse to a first top select gate line of the top select gate lines and which is adjacent to the first word line, such that a voltage of the first top select gate line reaches a second target voltage at a second time instant, wherein the second time instant is later than the first time instant.

2. The memory device of claim 1, wherein the peripheral circuit is configured to: apply the first pulse to the first word line at a third time instant; and apply the second pulse to the first top select gate line at a fourth time instant, wherein the fourth time instant is later than the third time instant.

3. The memory device of claim 1, wherein the peripheral circuit is configured to:

apply the second pulse to the first top select gate line at a same time instant as applying the first pulse to the first word line, wherein a duration of a rising edge of the second pulse is greater than a duration of a rising edge of the first pulse.

4. The memory device of claim 3, wherein the rising edge of the first pulse has a first slope, and the rising edge of the second pulse has a second slope, wherein the second slope is less than the first slope.

5. The memory device of claim 3, wherein the second pulse comprises a step-like waveform, and the rising edge of the second pulse comprises multiple steps.

6. The memory device of claim 1, wherein the word lines comprise a normal word line and a dummy word line between the normal word line and the top select gate lines;

the first word line is the dummy word line; and the peripheral circuit is further configured to:

apply a third pulse to a second word line of the normal word lines, such that the second word line reaches a third target voltage at a fifth time instant, wherein the fifth time instant is not earlier than the second time instant.

7. The memory device of claim 6, wherein the peripheral circuit is configured to:

apply the third pulse to the second word line at a same time instant as applying the first pulse to the first word line or at a same time instant as applying the second pulse to the first top select gate line, wherein a duration of a rising edge of the third pulse is greater than a duration of a rising edge of the second pulse.

8. The memory device of claim 1, wherein the top select transistors comprise a first top select transistor and a second top select transistor, wherein the first top select gate line is coupled to the first top select transistor;

the top select gate lines further comprise second top select gate lines coupled to the second top select transistors; and the peripheral circuit is further configured to:

apply a fourth pulse to a selected second top select gate line of the second top select gate lines, such that the selected second top select gate line reaches a fourth target voltage at a sixth time instant, wherein the sixth time instant is not later than the second time instant, and the fourth target voltage is greater than the second target voltage.

9. The memory device of claim 8, wherein the peripheral circuit is configured to:

apply the fourth pulse to the selected second top select gate line at a same time instant as applying the first pulse to the first word line, wherein a duration of a rising edge of the fourth pulse is equal to a duration of a rising edge of the first pulse; or apply the fourth pulse to the selected second top select gate line at a same time instant as applying the second pulse to the first top select gate line, wherein the duration of the rising edge of the fourth pulse is equal to or less than a duration of a rising edge of the second pulse.

10. A memory system, comprising:

a memory device, comprising:

a memory cell array comprising memory strings, wherein each of the memory strings comprises top select transistors and memory cells, and the top select transistors are located on a side of the memory cells;

top select gate lines coupled to the top select transistors;

word lines coupled to the memory cells; and a peripheral circuit coupled to the top select gate lines and the word lines, and configured to:

apply a first pulse to a first word line of the word lines, such that a voltage of the first word line reaches a first target voltage at a first time instant; and apply a second pulse to a first top select gate line of the top select gate lines and which is adjacent to the first word line, such that a voltage of the first top select gate line reaches a second target voltage at a second time instant, wherein the second time instant is later than the first time instant; and a memory controller coupled to the memory device and configured to control the memory device.

11. The memory system of claim 10, wherein the peripheral circuit is configured to: apply the first pulse to the first word line at a third time instant; and apply the second pulse to the first top select gate line at a fourth time instant, wherein the fourth time instant is later than the third time instant.

12. An operation method of a memory device, wherein the memory device comprises a memory cell array and a peripheral circuit coupled to the memory cell array, the memory cell array comprises memory strings, and each of the memory strings comprises memory cells and top select transistors; word lines are coupled to the memory cells, and select gate lines are coupled to the top select transistors; and the operation method comprises:

applying a first pulse to a first word line of the word lines, such that a voltage of the first word line reaches a first target voltage at a first time instant; and applying a second pulse to a first top select gate line of the top select gate lines and which is adjacent to the first word line, such that a voltage of the first top select gate line reaches a second target voltage at a second time instant, wherein the second time instant is later than the first time instant.

13. The operation method of claim 12, wherein:

the first word line is adjacent to the first top select gate line;

applying the first pulse to the first word line comprises applying the first pulse to the first word line at a third time instant; and applying the second pulse to the first top select gate comprises applying the second pulse to the first top select gate line at a fourth time instant, wherein the fourth time instant is later than the third time instant.

14. The operation method of claim 12, wherein applying the second pulse to the first top select gate line of comprises:

applying the second pulse to the first top select gate line at a same time instant as applying the first pulse to the first word line, wherein a duration of a rising edge of the second pulse is greater than a duration of a rising edge of the first pulse.

15. The operation method of the memory device of claim 14, wherein the rising edge of the first pulse has a first slope;

the applying the second pulse to the first top select gate line comprises:

applying the second pulse of which the rising edge has a second slope to the first top select gate line, wherein the second slope is less than the first slope.

16. The operation method of the memory device of claim 14, wherein the applying the second pulse to the first top select gate line comprises:

applying the second pulse in a step-like waveform to the first top select gate line, wherein the rising edge of the second pulse comprises multiple steps.

17. The operation method of the memory device of claim 13, wherein the word lines comprise a normal word line and a dummy word line between the normal word line and the top select gate line; the first word line is the dummy word line; and the operation method further comprises:

applying a third pulse to a second word line of a plurality of the normal word lines, such that the second word line reaches a third target voltage at a fifth time instant, wherein the fifth time instant is not earlier than the second time instant.

18. The operation method of the memory device of claim 17, wherein the applying the third pulse to the second word line of a plurality of the normal word lines comprises:

applying the third pulse to the second word line at a same time instant as applying the first pulse to the first word line or at a same time instant as applying the second pulse to the first top select gate line, wherein a duration of a rising edge of the third pulse is greater than a duration of a rising edge of the second pulse.

19. The operation method of the memory device of claim 13, wherein the top select transistors comprise a first top select transistor and a second top select transistor, and the first top select gate line is coupled to the first top select transistor; the top select gate lines further comprise second top select gate lines coupled to the second top select transistors; and the operation method further comprises:

applying a fourth pulse to a selected second top select gate line of the second top select gate lines, such that the selected second top select gate line reaches a fourth target voltage at a sixth time instant, wherein the sixth time instant is not later than the second time instant, and the fourth target voltage is greater than the second target voltage.

20. The operation method of claim 19, wherein the applying the fourth pulse to the selected second top select gate line of the second top select gate lines comprises:

applying the fourth pulse to the selected second top select gate line at a same time instant as applying the first pulse to the first word line, wherein a duration of a rising edge of the fourth pulse is equal to a duration of a rising edge of the first pulse; or applying the fourth pulse to the selected second top select gate line at a same time instant as applying the second pulse to the first top select gate line, wherein the duration of the rising edge of the fourth pulse is equal to or less than a duration of a rising edge of the second pulse.

* * * * *